US008550636B2

(12) United States Patent
Kitahara et al.

(10) Patent No.: US 8,550,636 B2
(45) Date of Patent: Oct. 8, 2013

(54) HIGH-PRESSURE DISCHARGE LAMP DEVICE AND PROJECTOR USING THE SAME

(75) Inventors: Yoshiki Kitahara, Osaka (JP); Katsuhiro Ono, Osaka (JP); Akira Taniuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 359 days.

(21) Appl. No.: 12/994,267

(22) PCT Filed: Jun. 8, 2009

(86) PCT No.: PCT/JP2009/002574
§ 371 (c)(1),
(2), (4) Date: Nov. 23, 2010

(87) PCT Pub. No.: WO2009/150817
PCT Pub. Date: Dec. 17, 2009

(65) Prior Publication Data
US 2011/0075116 A1    Mar. 31, 2011

(30) Foreign Application Priority Data
Jun. 13, 2008    (JP) ................................. 2008-155713

(51) Int. Cl.
*G03B 21/28* (2006.01)
(52) U.S. Cl.
USPC ........................................................ 353/98
(58) Field of Classification Search
USPC ............. 353/87, 98; 362/269, 270, 271–273, 362/277, 285, 286, 289, 523; 314/39–43
See application file for complete search history.

(56) References Cited

U.S. PATENT DOCUMENTS

| | | | |
|---|---|---|---|
| 3,758,769 A * | 9/1973 | Pichel | 362/264 |
| 2003/0201735 A1 | 10/2003 | Yamamoto et al. | |
| 2003/0214634 A1 * | 11/2003 | Akiyama | 353/31 |
| 2004/0207327 A1 * | 10/2004 | Takahashi et al. | 313/639 |
| 2007/0035949 A1 * | 2/2007 | Brates et al. | 362/276 |
| 2008/0088239 A1 | 4/2008 | Takezawa | |
| 2008/0088806 A1 | 4/2008 | Yoshii | |

FOREIGN PATENT DOCUMENTS

| | | |
|---|---|---|
| CN | 1449230 | 10/2003 |
| CN | 101165846 | 4/2008 |
| CN | 101165849 | 4/2008 |
| JP | 03-048836 | 3/1991 |
| JP | 05-062501 | 3/1993 |

(Continued)

OTHER PUBLICATIONS

Chinese Application No. 200980122333.9 Office Action dated Jul. 9, 2012, 13 pages including English translation.

*Primary Examiner* — Georgia Y Epps
*Assistant Examiner* — Danell L Owens

(57) ABSTRACT

To aim to provide a simple high-pressure discharge lamp apparatus. The lamp apparatus suppresses local temperature increase in an arc tube during lighting, and uniforms temperature in the arc tube. A lamp is built into a reflector so as to form a lamp unit such that a central axis of the lamp coincides with an optical axis of the reflector. A pair of rotating bodies with a fixed interval therebetween each has a circular outer circumferential surface, and the optical axis of the reflector coincides with a central axis of the circumferential surface of the rotating bodies. A pair of electrodes is electrically connected to the circumferential surface of each rotating body, and the rotating bodies are placed on two rotating rollers arranged in parallel. A drive motor drives the lamp unit in a fixed direction on the rotating rollers. Feeding members feed the rotating bodies with power.

19 Claims, 17 Drawing Sheets

(56) References Cited

FOREIGN PATENT DOCUMENTS

| | | |
|---|---|---|
| JP | 2007-048736 | 2/2007 |
| JP | 2007-329075 | 12/2007 |
| JP | 2008-147019 | 6/2008 |
| JP | 2008147019 A * | 6/2008 |

* cited by examiner

HIGH-PRESSURE DISCHARGE LAMP DEVICE AND PROJECTOR USING THE SAME

TECHNICAL FIELD

The present invention relates to a high-pressure discharge lamp device and a projector using the same.

BACKGROUND ART

As a light source for a projector, a short-arc high-pressure discharge lamp (hereinafter referred to simply as "lamp") is widely used, for example. The lamp is a light source that is close to a point light source, and has a high luminance and a high color rendering index. For example, the lamp is built into a reflector so as to form a lamp unit, the reflector having a concave reflective surface, and a longitudinal central axis of the lamp substantially coinciding with an optical axis of the reflector. The lamp unit is built into a projector and used.

An arc tube that mainly constitutes the lamp has a casing made of quartz glass. The arc tube includes a light-emitting part at a center thereof and seal parts adjacent to the light-emitting part, which extend outwards from each side of the light-emitting part. A pair of electrodes is disposed in the light-emitting part. In addition, a discharge space is formed within the light-emitting part.

The lamp is lighted under a high load in order to achieve the high luminance and the high color rendering index, as described above. As a result, the light-emitting part, especially an upper part thereof (an upper part of the discharge space) becomes extremely high temperature while the lamp is lighted. The quartz glass constituting the part crystallizes, and thereby cloudiness called devitrification occurs. In consequence, this part might be eventually damaged.

In addition, in the case where the temperature difference occurred in the light-emitting part is great, when tungsten that constitutes the electrodes diffuses during lighting, the tungsten blackens after attaching to a lower temperature part in the arc tube (e.g., a root part of the electrodes). As a result, this might cause lower luminance.

Because of this, it is preferable that the temperature in the arc tube, specifically in the light-emitting part should not overly rise, and that temperature distribution in the light-emitting part should be uniformed during lighting. Especially, in recent years, requirements for size reduction and high-power output of a projector are becoming higher. This leads to requirements for a small size arc tube and high-watt arc tube, and load on an arc tube is increasing. As a result, the problem above is becoming prominent.

In response, conventionally, there has been proposed an approach to solve the above problem by rotating an arc tube.

For example, there has been proposed an art of periodically rotating only an arc tube by a rotation unit connected to the arc tube (Patent Literature 1, for example), or an art of rotating not only an arc tube (a high-pressure discharge lamp) but also a reflector (a reflection mirror) integrated with the lamp when rotating the lamp by a rotation mechanism connected to the lamp (Patent Literature 2, for example). In addition, there has been proposed an art of providing a lamp unit, which includes an arc tube (a high-pressure discharge lamp) and a reflector (a reflection mirror), intermittently rotating the lamp unit not only in one direction but also in the opposite direction by a rotation mechanism, and reversing a rotational direction during the rotation (Patent Literature 3, for example).

CITATION LIST

Patent Literature

[Patent Literature 1]
Japanese Patent Application Publication No. H3-48836
[Patent Literature 2]
Japanese Patent Application Publication No. 2007-48736
[Patent Literature 3]
Japanese Patent Application Publication No. 2007-329075

SUMMARY OF INVENTION

Technical Problem

However, it proved that the conventional arts described above have the following problems and lack in practicality.

According to the art disclosed in the Patent Literature 1, since supporting units are rotated as supporting the both ends of the arc tube, one of the supporting units that support the ends of the arc tube is located in front of the lamp reflector. As a result, the art has a problem that a shadow of the supporting unit appears on an irradiation area.

According to the art disclosed in the Patent Literature 2, the lamp and the reflector (reflector) having an opening are integrated as an assembly. The rotating mechanism rotates the assembly, supporting only an end opposite to the opening of the reflector (reflector) or only an end of the lamp integrated with the reflector (reflector). Such a configuration makes the rotation mechanism complicated.

According to the art disclosed in the Patent Literature 3, since an apparatus intermittently rotates the reflector integrated with the arc tube (lamp) and reverses a rotational direction during the rotation, it needs each mechanism for rotating the reflector intermittently and reversing the rotational direction or the like. As a result, the apparatus itself becomes complicated.

The present invention is made in view of the above problems. The present invention aims to provide a simple-structured high-pressure discharge lamp apparatus and projector using the same that are capable of suppressing local temperature increase and uniforming temperature distribution in the arc tube.

Solution to Problem

The present invention provides a high-pressure discharge lamp apparatus, comprising: a lamp unit that comprises a high-pressure discharge lamp built into a reflector, such that a central axis of the high-pressure discharge lamp coincides with an optical axis of the reflector; a first rotating body that has an annular cross-section, and is attached to the reflector at a vicinity of an opening thereof, such that a center of the first rotating body is located on the optical axis; a first rotation supporting unit that supports the first rotating body rotatably on the center thereof; a rotation driving unit that drives the lamp unit so as to rotate in one direction about the central axis; and a feeding unit that feeds electric power to the high-pressure discharge lamp having a first feeding member, wherein the first rotating body has a first conductive portion that extends around an axis of the first rotating body, to which a first electrode of the high-pressure discharge lamp is electrically connected, and the first feeding member is electrically connected to the first conductive portion.

The "first rotating body" herein may be composed of one or more materials. When composed of one material, the first rotating body may have the first conductive portion configured with a conductive material, which extends around an axis of the first rotating body. On the other hand, when composed of plural materials all of which are conductive, the first rotating body may have the first conductive portion that extends around an axis of the first rotating body, or when composed of insulating materials and conductive materials combined in a multilayer structure, a part made of the conductive materials may be the first conductive portion. Also, the multilayer structure using plural materials includes a case in which a conductive process forms the first conductive portion that extends around an axis of the first rotating body on side surfaces or an outer circumferential surface of the insulating materials.

In addition, the "first rotating body" herein only needs to have an annular cross-section. For example, the first rotating body may be composed of a disk-shaped material with a through-hole in the center thereof, or a circular cylindrical-shaped material with a through-hole in the center thereof.

In addition, the "rotation driving unit" herein only needs to rotate the lamp unit. For example, the rotation driving unit may convey the driving to the first rotating body so as to rotate the first rotating body to which the lamp unit is attached. Or a base of the lamp unit may be cylindrical-shaped and the rotation may be conveyed to the base, such that the rotation driving unit may directly rotate the lamp unit.

In addition, the rotation driving unit and the first rotation supporting unit may be configured integrally or separately.

The "first feeding member" herein may be in contact with the first conductive portion so as to directly feed electric power, or in contact with another member that is in contact with the first conductive portion so as to feed electric power indirectly through the member.

Advantageous Effects of Invention

According to the high-pressure discharge lamp apparatus of the present invention, the lamp unit is mounted on the first rotating body, such that the center of the first rotating body is located on the optical axis of the lamp unit. The lamp unit rotates on a center of the first rotating body, and thus an upper portion of the arc tube shifts (is not fixed) while the lamp is turned on. As a result, the lamp apparatus is capable of suppressing temperature increase at the upper portion of the arc tube and uniforming temperature distribution therein. As a result, it is possible to reduce the development of devitrification and blackening in the arc tube. Also, it is possible to keep the arc tube from being damaged early on due to the devitrification or the like, and furthermore increase life.

In addition, the lamp unit is mounted on the first rotating body such that the center of the first rotating body is located on the optical axis of the lamp unit, and the lamp unit rotates on the center of the first rotating body. Thus even when the lamp is built into a projector or the like, a positional relation between the optical axis of the reflector and an optical system in the projector is not shifted. As a result, it is possible to prevent generation of illumination flickers generated by a shift of the optical axis.

Additionally, the first electrode of the high-pressure discharge lamp and the first conductive portion are electrically connected and electric power is fed to the first conductive portion of the first rotating body. As a result, this can simplify the structure of an electric power feeding path from the first conductive portion to the first electrode.

Also, the high-pressure discharge lamp apparatus, further comprises: a second rotating body that has an annular cross-section, and is attached to the reflector at a vicinity of a base of the high-pressure discharge lamp, such that a center of the second rotating body is located on the optical axis; a second rotation supporting unit that supports the second rotating body rotatably on the center thereof; and the feeding unit that having a second feeding member, wherein the second rotating body has a second conductive portion that extends around an axis of the second rotating body, to which a second electrode of the high-pressure discharge lamp is electrically connected, and the second feeding member is electrically connected to the second conductive portion.

The "second rotating body" herein may be composed of one or more materials. When composed of one material, the second rotating body may have the second conductive portion configured with a conductive material, which extends around an axis of the second rotating body. On the other hand, when composed of plural materials all of which are conductive, the second rotating body may have the second conductive portion that extends around an axis of the second rotating body, or when composed of insulating materials and conductive materials combined in a multilayer structure, a part made of the conductive materials may be the second conductive portion. Also, the multilayer structure using plural materials includes a case in which a conductive process forms the second conductive portion that extends around an axis of the second rotating body on side surfaces or an outer circumferential surface of the insulating materials.

In addition, the "second rotating body" herein only needs to have an annular cross-section. For example, the second rotating body may be composed of a disk-shaped material with a through-hole in the center thereof, or a circular cylindrical-shaped material with a through-hole in the center thereof.

The "second feeding member" herein may be in contact with the second conductive portion so as to directly feed electric power, or in contact with another member that is in contact with the second conductive portion so as to feed electric power indirectly through the member.

In the configuration above, the second electrode of the high-pressure discharge lamp and the second conductive portion are electrically connected and electric power is fed to the second conductive portion of the second rotating body. As a result, this can simplify the structure of an electric power feeding path from the second conductive portion to the second electrode.

Also, the rotation driving unit rotates the first rotating body so as to rotate the lamp unit. In this configuration, the first rotating body is supported rotatably. Thus it is possible to easily rotate the first rotating body, and prevent the configuration of the whole apparatus from becoming complicated.

Moreover, the first rotating body has an annular shape with a circular outer circumference, and the rotation driving unit has a rotary body which is in contact with an outer circumferential surface of the first rotating body, and rotates the first rotating body by rotatably driving the first rotating body.

In this configuration, the first rotating body is supported rotatably. Thus it is possible to easily rotate the first rotating body, and prevent the configuration of the whole apparatus from becoming complicated.

Also, the first feeding member includes a slip ring that contacts with the first conductive portion, or the second feeding member includes a slip ring that contacts with the second conductive portion. In this configuration, it is possible to prevent the electric power feeding path from disturbing the rotation in accordance with the rotation of the lamp unit. As a result, the one-way rotation of the lamp unit can be facilitated.

Also, the lamp unit rotates at a rotation speed in a range of 1 to 20 rotations per minute. In this configuration, even if an arc between the pair of electrodes vibrates in accordance with the rotation of the lamp unit during lighting, human visual sense can hardly recognize them. As a result, illumination flickers of the lamp built into the projector or the like can be extremely reduced.

Moreover, the high-pressure discharge lamp is a high-pressure mercury lamp that contains mercury of 250 [mg/cm$^3$] or greater. In this configuration, it is possible to greatly extend a service life of the high-pressure mercury lamp.

The present invention provides a projector, comprising: the high-pressure discharge lamp apparatus; an optical unit operable to form an optical image by modulating light produced by the high-pressure discharge lamp apparatus; and a projection unit operable to magnify the optical image and project the magnified optical image. This configuration realizes a projector with a prolonged service life having a simple configuration.

DESCRIPTION OF EMBODIMENTS

Preferred embodiments of the present invention are described in detail below with reference to the drawings.

First Embodiment

1. General Structure

Figure 1:
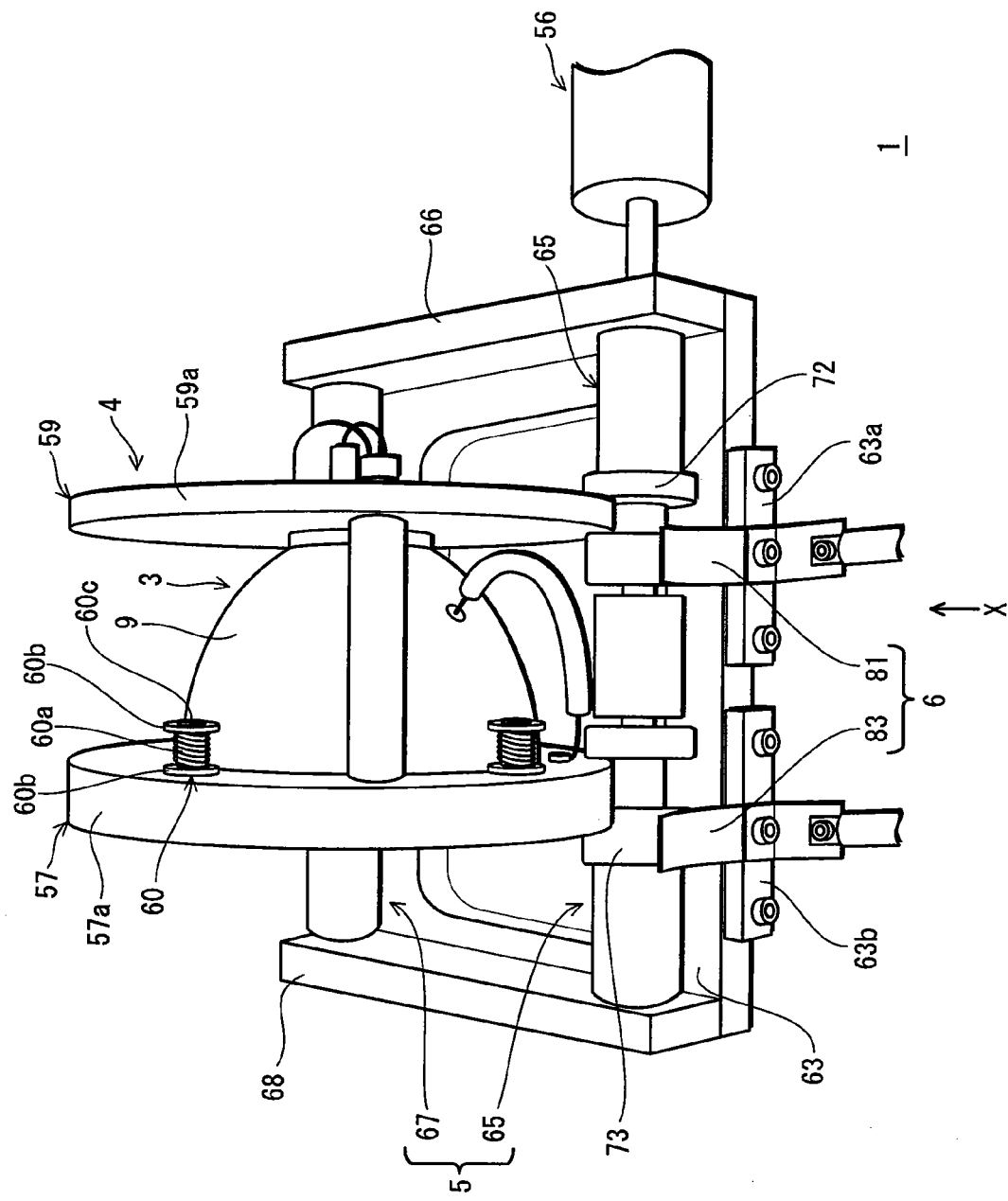
FIG. 1 is a perspective view of a high-pressure mercury lamp apparatus according to a first embodiment of the present invention.
Figure 2:
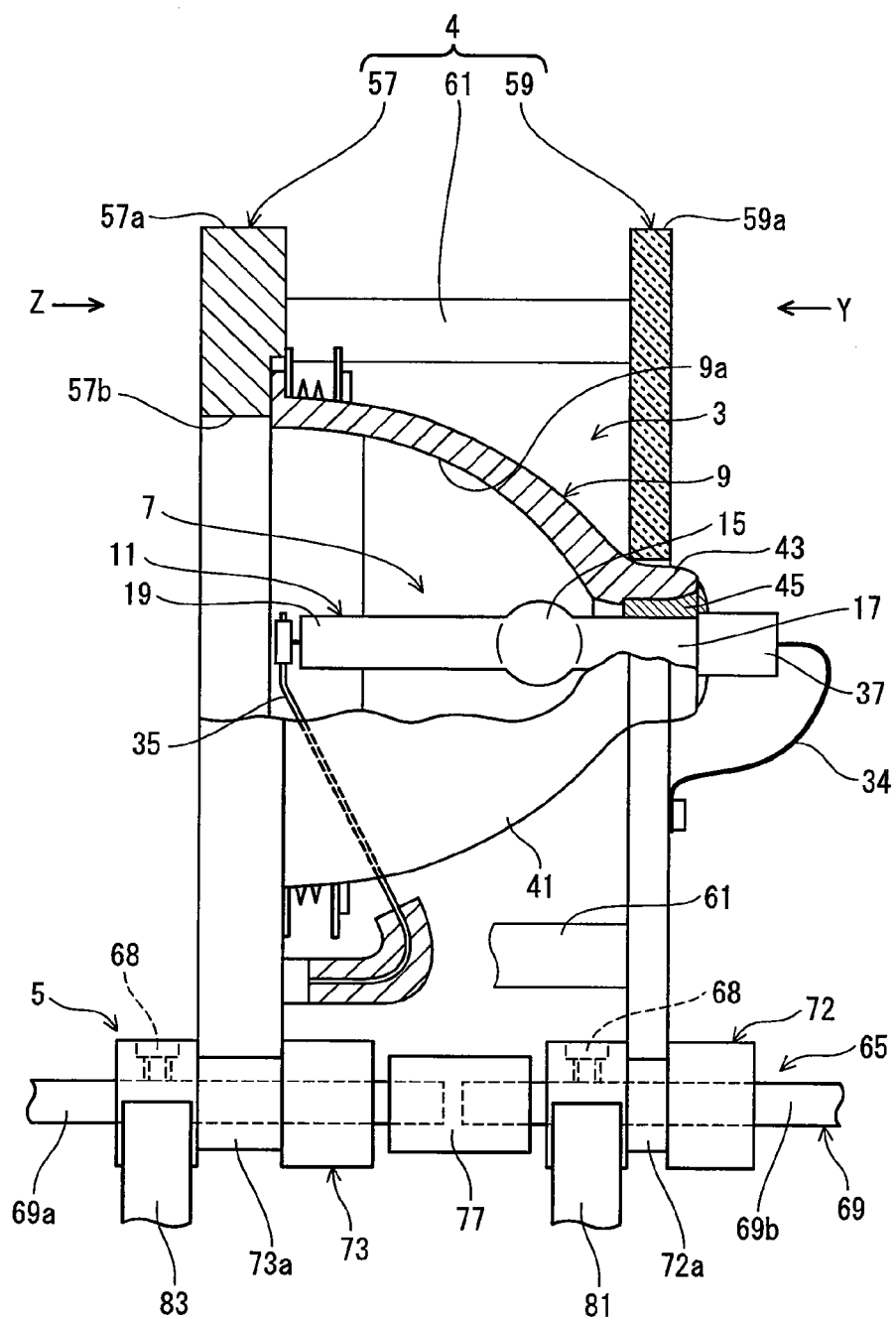
FIG. 2 shows a part of the lamp apparatus as seen in an arrow X direction shown in FIG. 1.

FIG. 1 is a perspective view of a high-pressure mercury lamp apparatus according to a first embodiment of the present invention. FIG. 2 shows a part of the high-pressure mercury lamp apparatus as seen in an arrow X direction shown in FIG. 1.

A high-pressure mercury lamp apparatus (hereinafter referred to simply as "lamp apparatus") 1 includes a high-pressure mercury lamp (hereinafter referred to simply as "lamp") 7 with a pair of electrodes. The lamp 7 is built into a reflector 9 so as to form a lamp unit, the reflector having a concave reflective surface, and a central axis of the lamp 7 coinciding with an optical axis of the reflector 9. A pair of rotating bodies 57 and 59 has outer circumferential surfaces 57a and 59a, respectively. The rotating bodies 57 and 59 are fitted onto the reflector 9 of the lamp unit 3 with a fixed interval therebetween, such that the optical axis of the reflector 9 coincides with a central axis of each of circumferences that constitute the outer circumferential surfaces 57a and 59a of the rotating bodies 57 and 59 respectively included in the rotating bodies 57 and 59. Also, the pair of electrodes of the lamp 7 is electrically connected to conductive portions of the rotating bodies 57 and 59, respectively. The rotating bodies 57 and 59 are mounted on plural (here two) rotating rollers 65 and 67 that are arranged in parallel such that the outer circumferential surfaces 57a and 59a respectively included in the rotating bodies 57 and 59 are in contact with the rotating rollers 65 and 67. A drive motor 56 drives the rotating rollers 65 and 67 so as to rotate the lamp unit 3 in a fixed direction. Slip rings 81 and 83 ("feeding members" of the present invention) feed electric power to the circumferential surfaces while the lamp unit 3 is rotating.

That is, the lamp unit 1 includes the following: the lamp unit 3 including the lamp 7 and the reflector 9; a supporting unit 4 that supports the lamp unit 3; a rotating unit 5 that rotates the supporting unit 4 in a fixed direction, supporting rotatably the supporting unit 4 and; and a feeding unit 6 that feeds electric power to the lamp 7.

2. Lamp Unit

The lamp unit 3 includes, as shown in FIG. 2, the lamp 7 having an arc tube 11 and the reflector 9 that reflects light emitted from the lamp 7 (precisely, a part of the emitted light), in a desired direction (direction toward an opening of the reflector 9). The reflector 9 has a concave reflective surface 9a. The lamp 7 is built into the reflector 9 such that the central axis of the lamp 7 coincides with the optical axis of the reflector 9.

(1) Lamp

Figure 3:
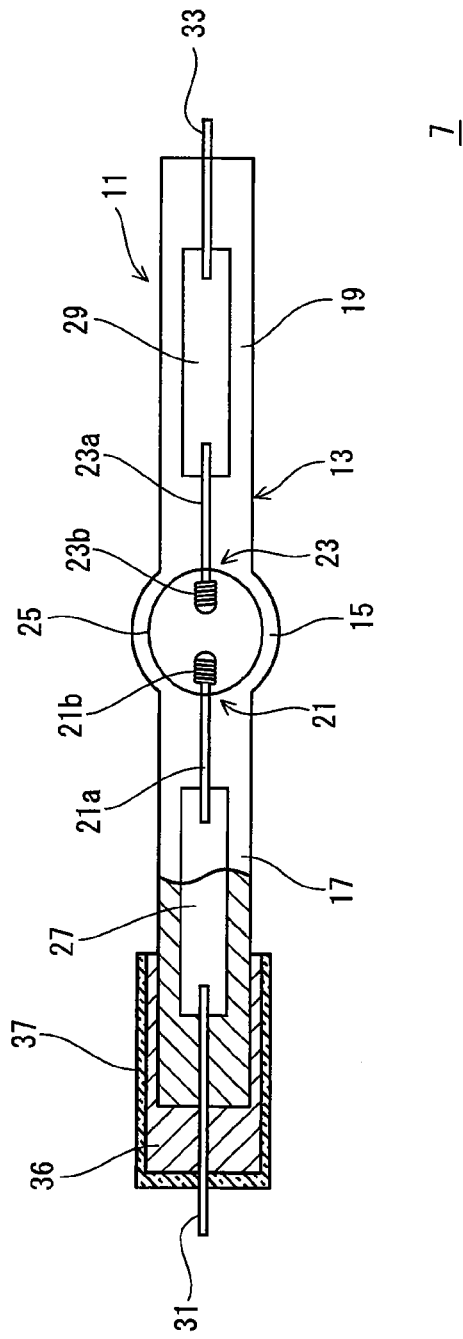
FIG. 3 is a partially cutaway front view of the lamp according to the first embodiment.

FIG. 3 is a partially cutaway front view of a configuration of the lamp 7 according to the present embodiment.

The lamp 7 includes the arc tube 11 and a base 37.

The arc tube 11 has a casing 13 made of quartz glass. The arc tube 11 also includes a light-emitting part 15 of a substantially spheroidal shape about a center of the tube, and seal parts 17 and 19 of a substantially cylindrical shape adjacent to the light-emitting part 15, which extend outwards from each side of the light-emitting part 15.

The arc tube 11 (light-emitting part 15) contains therein mercury (Hg) that is a light-emitting material, a rare gas for aiding activation such as Argon (Ar), and a halogen material for halogen cycle such as Bromine (Br). Each of them has a predetermined amount. The seal parts 17 and 19 are sealed by a known shrink seal method.

As an example, the light-emitting part 15 has a center part (where an outer diameter is largest) having an inner diameter of 5 [mm], an outer diameter of 12 [mm], and an internal volume of 0.1 [cc]. The amount of enclosed mercury is set to be in a range of 150 [mg/mm$^3$] to 350 [mg/mm$^3$] inclusive, e.g., 250 [mg/mm$^3$]. Enclosed Argon (at 25[° C.]) is set to be 30 [kPa]. Enclosed Bromide is set to be 0.5×10$^{-3}$ [μmol].

Inside the light-emitting part 15, a pair of electrodes 21 and 23 is disposed such that end portions (tips) of the pair of electrodes 21 and 23 are opposite to each other. The electrodes 21 and 23 are made of tungsten (W), for example. A gap between them is set in a range of 0.5 [mm] to 2.0 [mm] inclusive, e.g., 1.2 [mm].

One of the end portions of each of the electrodes 21 and 23 is located in a discharge space 25. The other end portion is connected to one of end portions of each of external leads 31 and 33 through rectangular strip-shaped metal foils 27 and 29 that are airtightly sealed to the seal parts 17 and 19, respectively. The other end portion of external leads 31 and 33 projects outward from the end surfaces of seal parts 17 and 19 respectively. The other end portion of the external lead 31 is connected to power-feeding line 35, as shown in FIG. 2. The other end portion of the external lead 33 is connected to power-feeding line 34 through the base 37, as shown in FIG. 2.

The electrodes 21 and 23 have electrode rods 21a and 23a and electrode coils 21b and 23b, respectively. One of end portions (tips) of each of the electrode rods 21a and 23a is located in the discharge space 25. The other end portion of each electrode rod is joined to the above metal foils 27 and 29 by welding, for example. The electrode coils 21b and 23b are attached to one of the end portions of each of the electrode rods 21a and 23a. In addition, the electrode rods 21a and 23a each have a substantially cylindrical form having a substantially annular cross-section, for example.

The base 37 is fixed to the end of the seal part 17 by a cement 36 or the like.

(2) Reflector

As shown in FIG. 1 and FIG. 2, the reflector 9 includes a funnel-shaped reflector body 41 and a cylindrical lamp supporting section 43. An inner surface of the reflector body 41 has a concave reflective surface 9a. The cylindrical lamp supporting section 43 extends from the center of the rear side of the reflector body 41 (i.e., the bottom side of the reflector body 41, and the opposite side of the opening of the reflector). One of examples of the reflector 9 is a so-called dichroic reflector made of hard glass.

The reflector 9 holds one of the seal parts of the lamp 7 (arc tube 11), here the seal part 17. Specifically, the seal part 17 of the arc tube 11 is loosely inserted into the lamp supporting section 43 of the reflector 9. In this state, the central axis of the arc tube 11 coincides with the optical axis of the reflector 9, as described above. The lamp supporting section 43 and the seal part 17 are bonded to each other by an adhesive 45 that fills a gap therebetween.

The adhesive 45 here is for example an inorganic adhesive mainly composed of silica, alumina, silica-alumina or the like. An example of such an inorganic adhesive is Sumiceram-S (manufactured by ASAHI Chemical Co., Ltd.).

The reflective surface 9a is composed of a dielectric multilayer film (such as $TiO_2/SiO_2$ or $Ta_2O_5/SiO_2$) that is formed by a vacuum vapor deposition process, for example. The reflector 9 reflects a visible ray that is emitted from the light-emitting part 15 toward an irradiated area, by the reflective surface 9a.

3. Supporting Unit

Figure 4:
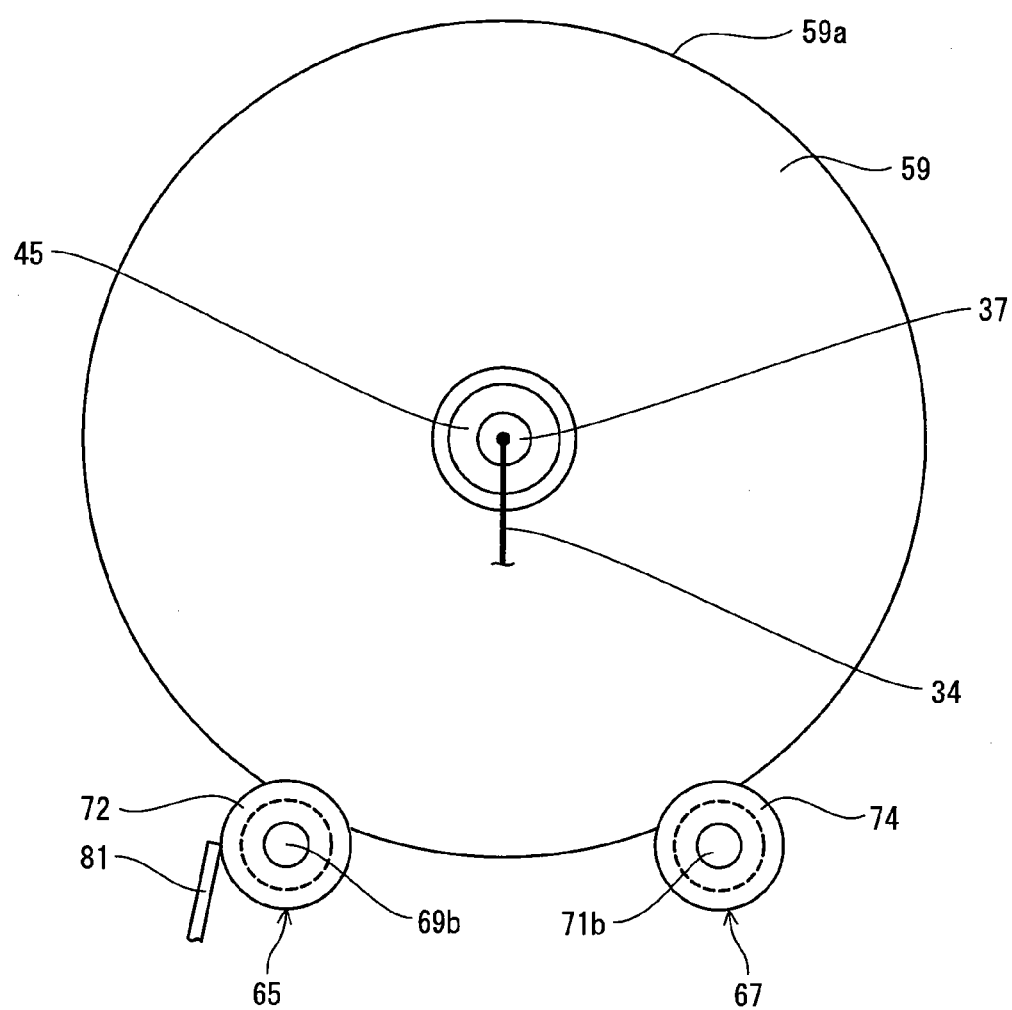
FIG. 4 shows the lamp apparatus as seen in an arrow Y direction shown in FIG. 2.
Figure 5:
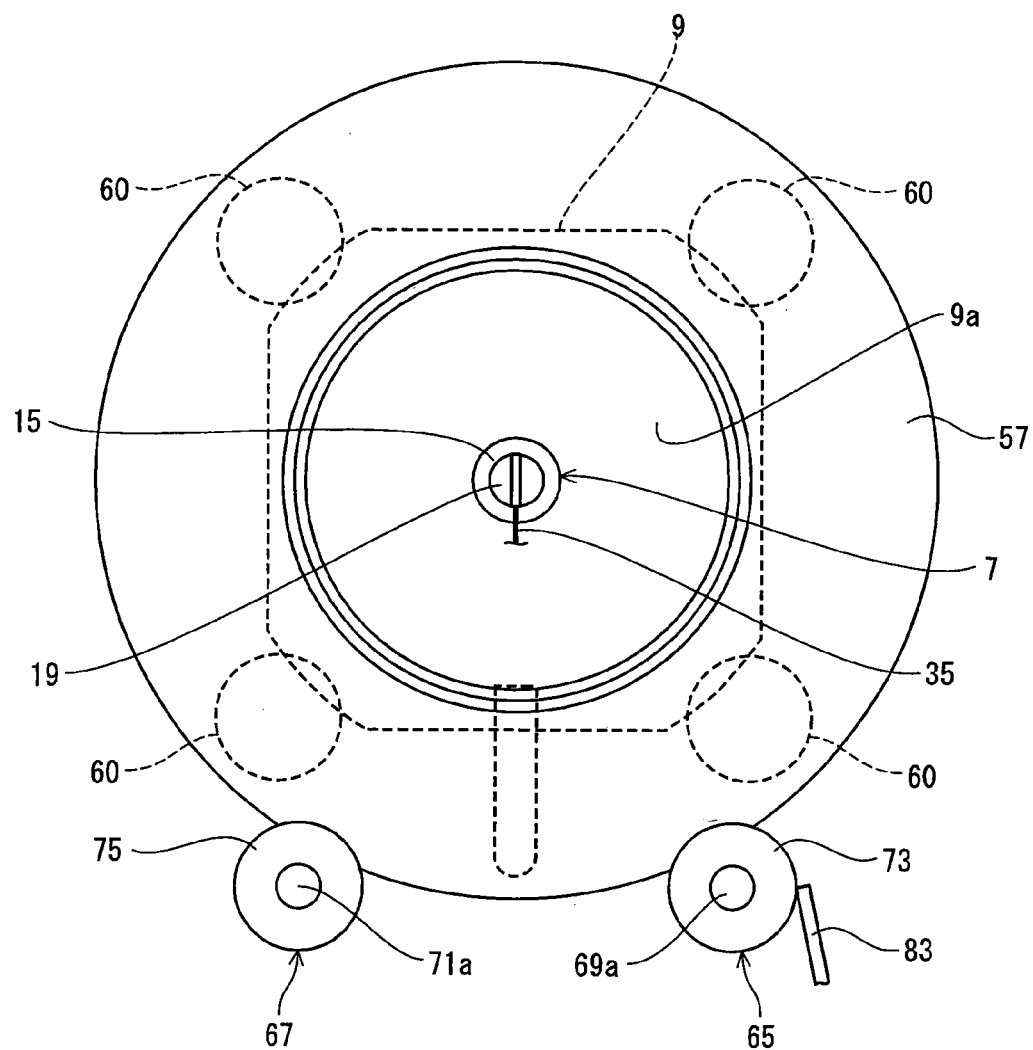
FIG. 5 shows the lamp apparatus as seen in an arrow Z direction shown in FIG. 2.
Figure 6:
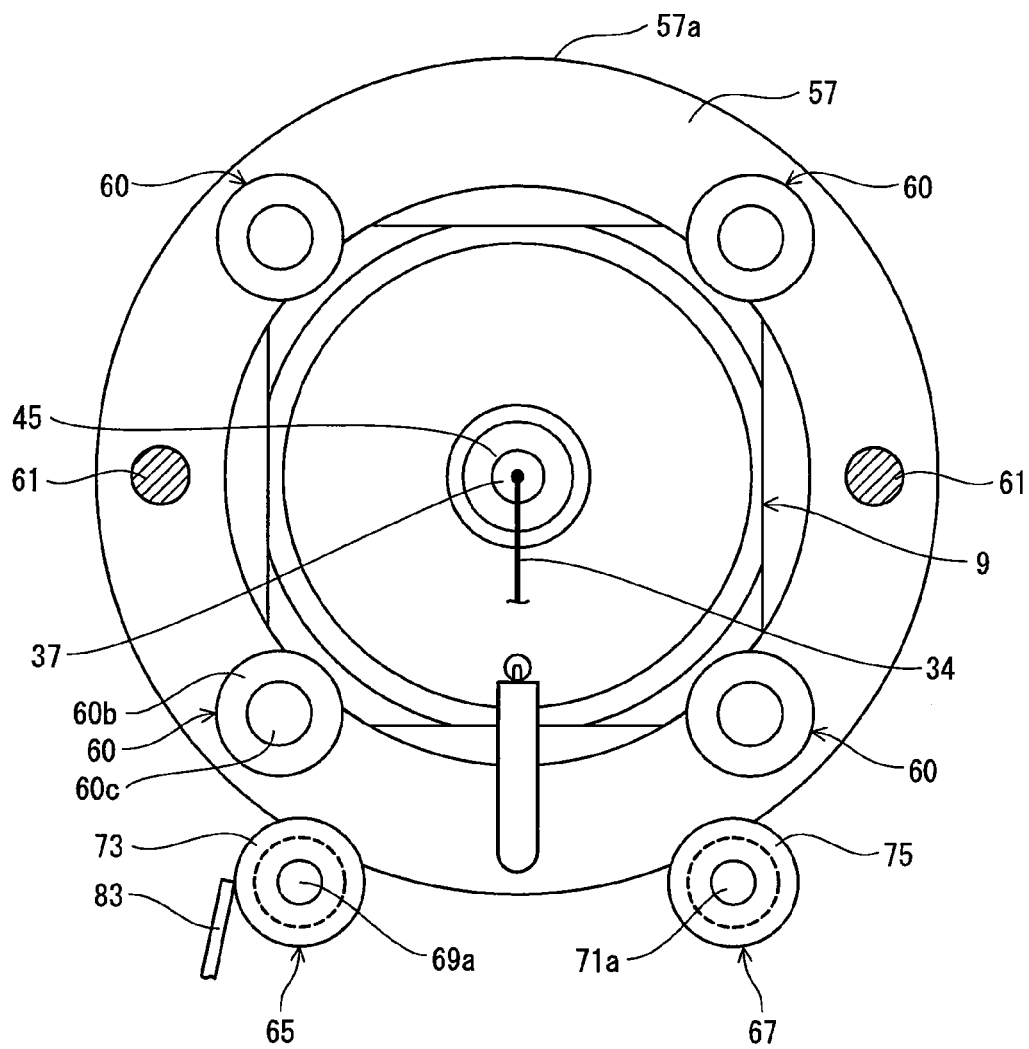
FIG. 6 shows the lamp apparatus without a rotating body as seen in the arrow Y direction shown in FIG. 2.

FIG. 4 shows the lamp apparatus as seen in an arrow Y direction shown in FIG. 2. FIG. 5 shows the lamp apparatus as seen in an arrow Z direction shown in FIG. 2. FIG. 6 shows the lamp apparatus without a rotating body as seen in the arrow Y direction shown in FIG. 2.

The supporting unit 4 has the pair of rotating bodies 57 and 59, and plural (here two) connecting rods 61 that connect the rotating bodies 57 and 59 to each other. The pair of rotating bodies 57 and 59 is fitted onto the outer surface of the reflector 9 at a specified interval in the drawing direction of an optical axis A of the reflector 9.

The rotating bodies 57 and 59 are connected to each other by the connecting rods 61 in a parallel state. The connecting rods 61 are disposed at equal intervals in the circumferential direction of the rotating bodies 57 and 59.

In the present embodiment, one of the pair of rotating bodies 57 and 59, that is, the rotating body 57 ("first rotating body" of the present invention) is attached to the reflector 9 at a vicinity of the opening thereof, by a cement (not shown in figure) or a fixing tool 60. The other rotating body, that is, the rotating body 59 ("second rotating body" of the present invention) is attached to the lamp supporting section 43 by a cement (not shown in figure) or a fixing tool 60.

As shown in FIG. 1, the fixing tool 60 here is composed of a spring 60a, a pair of washers 60b, and a screw 60c. A screw portion of a screw 62a is inserted into a through-hole of the pair of washers 60b that sandwich the spring 60a therebetween.

The rotating body 57 has, in its central portion, a through-hole 57b (transmitting region of light emitted from the lamp) that is larger than the opening of the reflector 9. An open end of the reflector 9 is fixed so as to be in contact with the rotating body 57.

As shown in FIG. 4 and FIG. 5, the pair of the rotating bodies 57 and 59 has an annular shape that has a center on the optical axis A (the center of the annular shape is referred to as a central axis) as seen in the drawing direction of the optical axis A of the reflector 9. The rotating bodies 57 and 59 support the lamp unit 3 such that the optical axis of the reflector 9 of the lamp unit 3 coincides with the central axis of each of the rotating bodies 57 and 59 (in other words, the rotating bodies 57 and 59 are located on the same axis).

The pair of the rotating bodies 57 and 59 is composed of a conductive material such as stainless. The rotating bodies 57 and 59 are electrically connected to the electrodes 23 and 21 of the lamp 7, respectively.

Specifically, the electrode 21 is connected to the rotating body 59 via the external lead 31, the base 37 and the power-feeding line 34, while the electrode 23 is connected to the rotating body 57 via the external lead 33 and the power-feeding line 35. The connecting rods 61 are each composed of an insulating material, but if a portion that contacts each of the rotating bodies 57 and 59 is insulated, a conductive material may be also employed.

4. Rotating Unit

As shown in FIGS. 1, 2 and 4-6, the rotating unit 5 includes a pair of rotating rollers 65 and 67. The rotating rollers 65 and 67 are in contact with the outer circumferential surfaces 57a and 59a respectively included in the pair of the rotating bodies 57 and 59 of the supporting unit 4. The supporting unit 4 is rotatably mounted on the pair of rotating rollers 65 and 67. The drive motor 56 is attached to at least one of the rotating rollers 65 and 67 (here the rotating roller 65) which functions as a drive axis for the rotating roller 65 that rotates the supporting unit 4 ("first rotation supporting unit", "second rotation supporting unit", and "rotation driving unit" of the present invention).

In the present embodiment, the rotating rollers 65 and 67 include rotating shafts 69 and 71, and roller parts 72, 73, 74 and 75. The rotating shafts are rotatably supported by a pair of parallel boards 66 and 68 shown in FIG. 1. The roller parts 72, 73, 74 and 75 are attached to the rotating shafts 69 and 71, respectively. The roller parts 73 and 75 are in contact with the outer circumferential surfaces 57a of the rotating bodies 57 of the supporting unit 4, while the roller parts 72 and 74 are in contact with the outer circumferential surfaces 59a of the rotating body 59 of the supporting unit 4.

The rotating roller 65 is composed of the rotating shaft 69 and the roller parts 72 and 73 (see FIG. 2), while the rotating roller 67 is composed of the rotating shaft 71 and the roller parts 74 and 75.

As shown in FIGS. 4-6, the pair of the rotating rollers 65 and 67 is provided in a direction perpendicular to the optical axis A of the reflector 9 at a fixed interval (that is, so as to be parallel to each other). Any interval for which the pair of the rotating rollers 65 and 67 can rotate to stably support the supporting unit 4 is sufficient.

The rotating rollers 65 and 67 have the same structure, and accordingly only the rotating roller 65 is explained here. Some parts of the rotating roller 67 are not shown in the figures, and denoted by reference numerals in parentheses.

As shown in FIG. 2, the rotating shaft 69 (71) includes rotating shafts 69a (71a) and 69b (71b) that are connected to each other by a connection member 77 (79) composed of an insulating material. The rotating shaft 69a (71a) and the rotating shaft 69b (71b) are connected to each other such that the central axes of the rotating shaft 69a (71a) and the rotating shaft 69b (71b) are aligned on the same line.

The roller part 73 (75) in contact with the rotating body 57 is attached to the rotating shaft 69a (71a), while the roller part 72 (74) in contact with the rotating body 59 is attached to the rotating shaft 69b (71b), by screws 68. The rotation of the rotating shaft 69 (71) rotates the outer circumferential surfaces 57a and 59a respectively included in the rotating bodies 57 and 59 of the supporting unit 4. The supporting unit 4 is placed on the roller parts 73 (75) and 72 (74) that slide in contact with the rotating bodies 57 and 59. The roller part 73 is "rotary body" of the present invention.

As shown in FIG. 2, central portions of the roller parts 72 (74) and 73 (75) in the longitudinal direction are recessed. The rotating bodies 57 and 59 of the supporting unit 4 engage with these recessed portions 72a (74a) and 73a (75a), respectively, so as not to move in the longitudinal direction of the rotating rollers 65 and 67.

5. Power Feeding Unit

As shown in FIG. 1, the power feeding unit 6 has feeding members 81 and 83. These feeding members are attached to a base board 63 on which the parallel boards 66 and 68 are attached by insulating members 63a and 63b, for example. The feeding member 83 is "first feeding member", and the feeding member 81 is "second feeding member" of the present invention.

These feeding members 81 and 83 are in contact with the outer surfaces of the roller parts 72 and 73 composed of a conductive material, respectively. The feeding members 81 and 83 are connected, for example, by slip rings to a lighting circuit for lighting the lamp (figure omitted). Electric power is fed to the lamp 7, via the feeding members 81 and 83, the roller parts 72 and 73, the rotating bodies 57 and 59, and the power-feeding lines 34 and 35.

6. Operation

Rotational operation is explained below in regard to the lamp unit 3 in the lamp apparatus 1 with the above configuration.

First, when a switch for lighting the lamp 7 is turned on, alternating current supplies start each from the lighting circuit through the feeding member 83, the roller part 73, the rotating body 57, the power-feeding line 35, the external lead 33 and the metal foil 29 to the electrode 23, and through the feeding member 81, the roller part 72, the rotating body 59, the power-feeding line 34, the base 37, the external lead 31 and the metal foil 27 to the electrode 21.

Simultaneously with this or when a predetermined time has elapsed from the lighting of the lamp 7, the drive motor 56 starts driving a rotation. Even though a certain amount of time has passed since the beginning of lighting, if the lamp has not lighted in a steady-state lighting condition yet, the problem of devitrification does hardly occur. That is because the temperature in the arc tube 11 has not reached to the temperature at which devitrification occurs in a part of the arc tube 11. However, from the standpoint of gaining a fine lamp property by uniforming temperature distribution in the light-emitting part 15, the lamp unit 3 favorably begins rotating from an early stage at which the temperature of the lamp 7 is low.

When the drive motor 56 starts driving the rotation, the rotating roller 65 connected to the drive motor 56 begins rotating. The supporting unit 4 (including the lamp unit 3) placed on the pair of the rotating rollers 65 and 67 begins rotating in a fixed direction by sliding between the rotating bodies 57 and 59 and the roller parts 72, 73, 74 and 75 about the central axis of the rotating bodies 57 and 59.

During the rotation of the lamp unit 3, electric power is fed to the lamp 7 by the rotating bodies 57 and 59 of the supporting unit 4 that supports the lamp 7 and rotates together with the lamp unit 3. The feeding members 81 and 83 are slip rings connected to the lighting circuit. The slip rings are in contact with the roller parts 72 and 73. As a result, the conventional configuration is unnecessary, in which the rotation reverses during the operation so as not to cut lead lines due to the rotation of the lamp unit.

A test has confirmed that the temperature in the light-emitting part 15 of the lamp 7 is uniformed when the lamp unit rotates at a rotation speed in a range of 1 to 20 rotations per minute.

In addition, the lamp unit 3 is held by the rotating bodies 57 and 59 that are fixed at two parts on the circumferential surface of the reflector 9 at a specified interval in the drawing direction of the optical axis, such that the central axis of the rotating bodies 57 and 59 coincides with the optical axis of the reflector 9. As a result, the supporting mechanism of the lamp unit 3 is simplified, and it is possible to prevent the rotation with the optical axis of the reflector 9 inclined with respect to the central axis of the rotating bodies 57 and 59.

Second Embodiment

Figure 7:
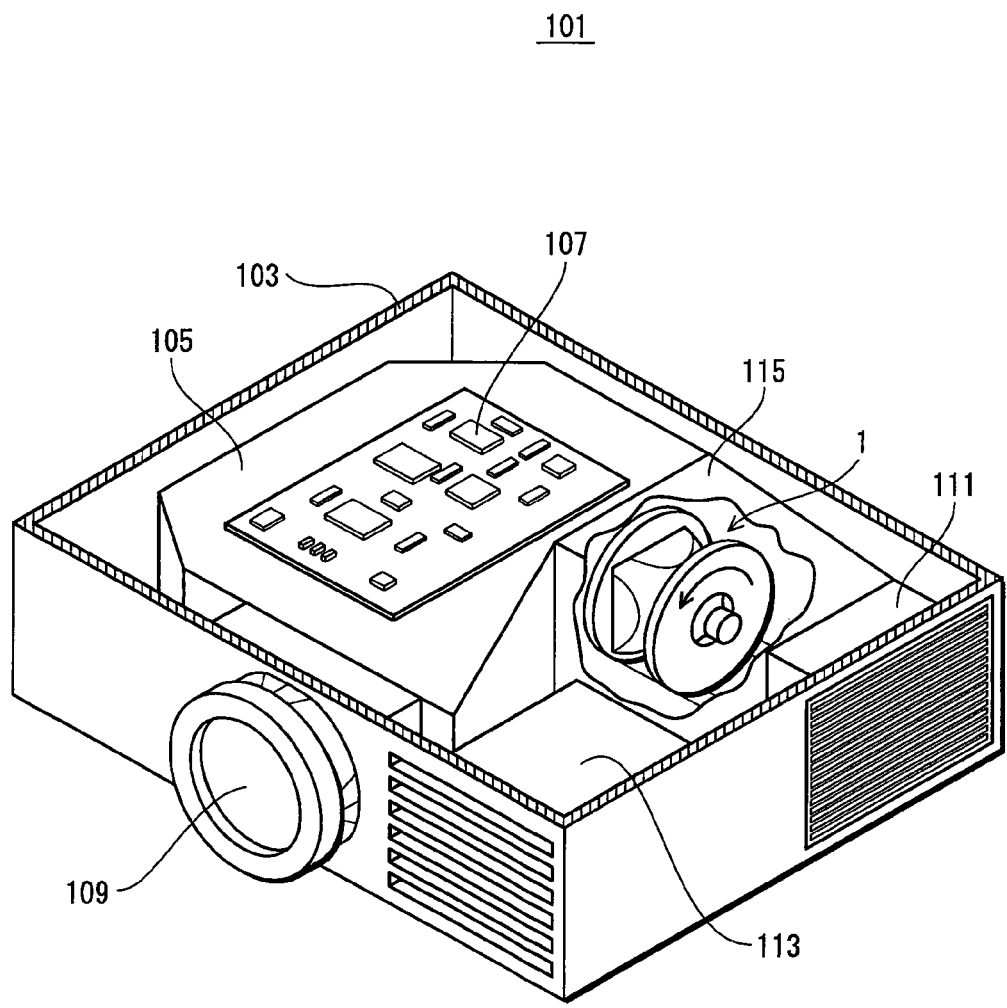
FIG. 7 is a partially cutaway perspective view of a configuration of a front projector as a projection type image display apparatus according to a second embodiment of the present invention.

A projection type image display apparatus that is a second embodiment of the present invention is explained in reference to FIG. 7.

The FIG. 7 shows a schematic structure of a front projector 101. This is an example of a projection type image display apparatus in which the lamp apparatus 1 according to the second embodiment is used.

The front projector 101 is a projector that projects an image towards a screen (not shown) set in front thereof. FIG. 7 shows a casing 103 without a top plate, which will be described later.

The front projector 101 includes the lamp apparatus 1 that is light source, an optical unit 105, a control unit 107, a projection lens 109, a cooling fan unit 111, and a power source unit 113 and others, all of which are housed in the casing 103. The optical unit 105 has an image forming unit that forms an image by modulating incident light, and a lighting unit that irradiates illumination light produced by the lamp apparatus 1, on the image forming unit (both not shown). The lighting unit has a color wheel consisting of a 3-color filter and others (not shown), and splits the illumination light into three primary colors of R, G, and B, and irradiates the light of these colors on the image forming unit.

The control unit 107 controls drive of the image forming unit and others. The projection lens 109 magnifies the optical image modulated and formed by the image forming unit, and projects the magnified optical image. The power source unit 113 converts the electric power fed by a commercial power source into an electric power suitable for each of the control unit 107 and the lamp apparatus 1. After that, the power source unit 113 feeds the electric power to the control unit 107 and the lamp apparatus 1.

The lamp apparatus 1 is housed in a case 115 that is connected to the optical unit 105 and a light leakage during lighting of the lamp is prevented.

As above, the structure of the projection type image display apparatus according to the second embodiment of the present invention uses a lighting apparatus with a prolonged life. Accordingly, it is possible to realize the projection type image display apparatus with a prolonged service life.

Third Embodiment

In the first embodiment, the rotating bodies are at least attached to both of the front side (at a vicinity of the opening) and the rear side (at a vicinity of the base) of the reflector. However, in the present invention, the rotating body only needs to be attached to the front side (at a vicinity of the opening) of the reflector ("first rotating body" of the present invention). Hereinafter, an embodiment will be described in which the rotating body is attached to the reflector only at the vicinity of the opening thereof.

Figure 8:
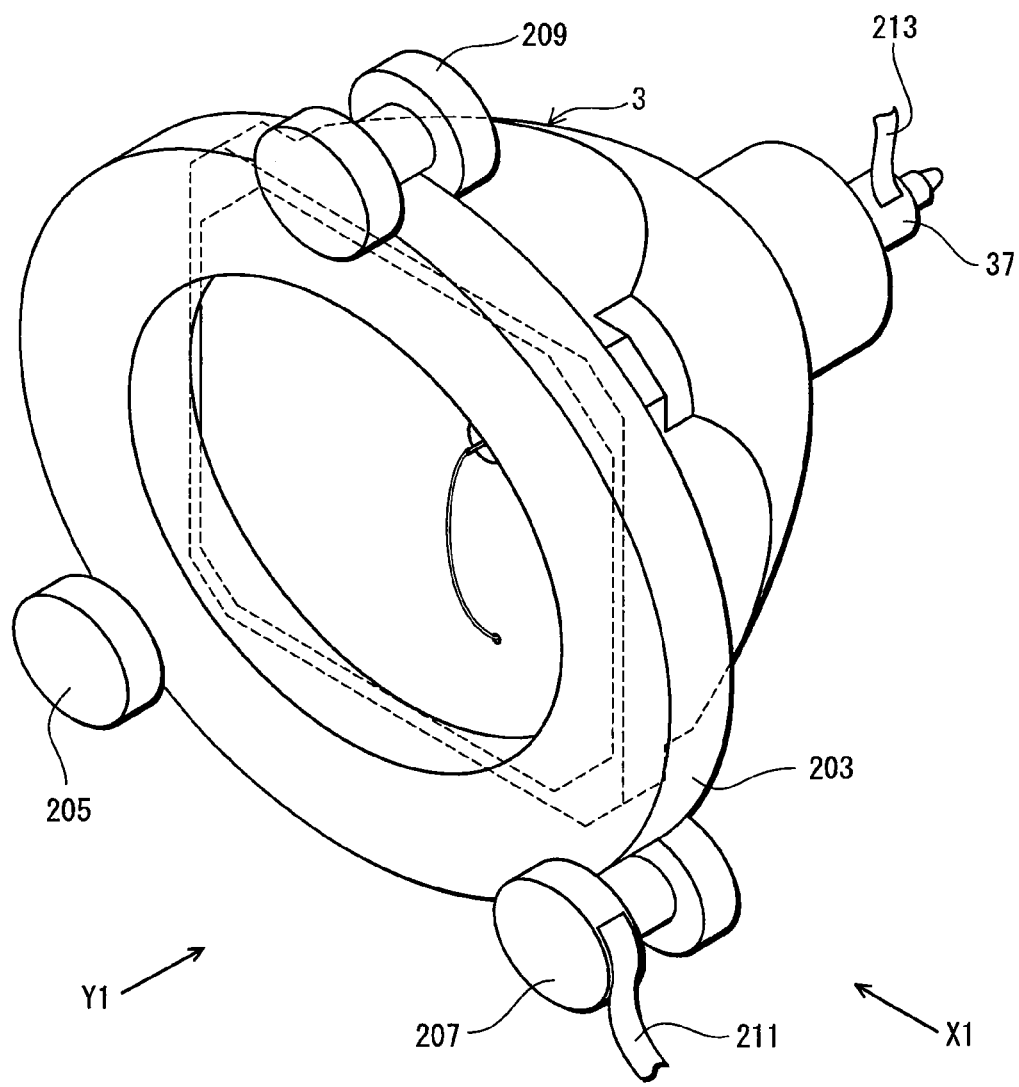
FIG. 8 is a perspective view of a lamp apparatus according to a third embodiment of the present invention.
Figure 9:
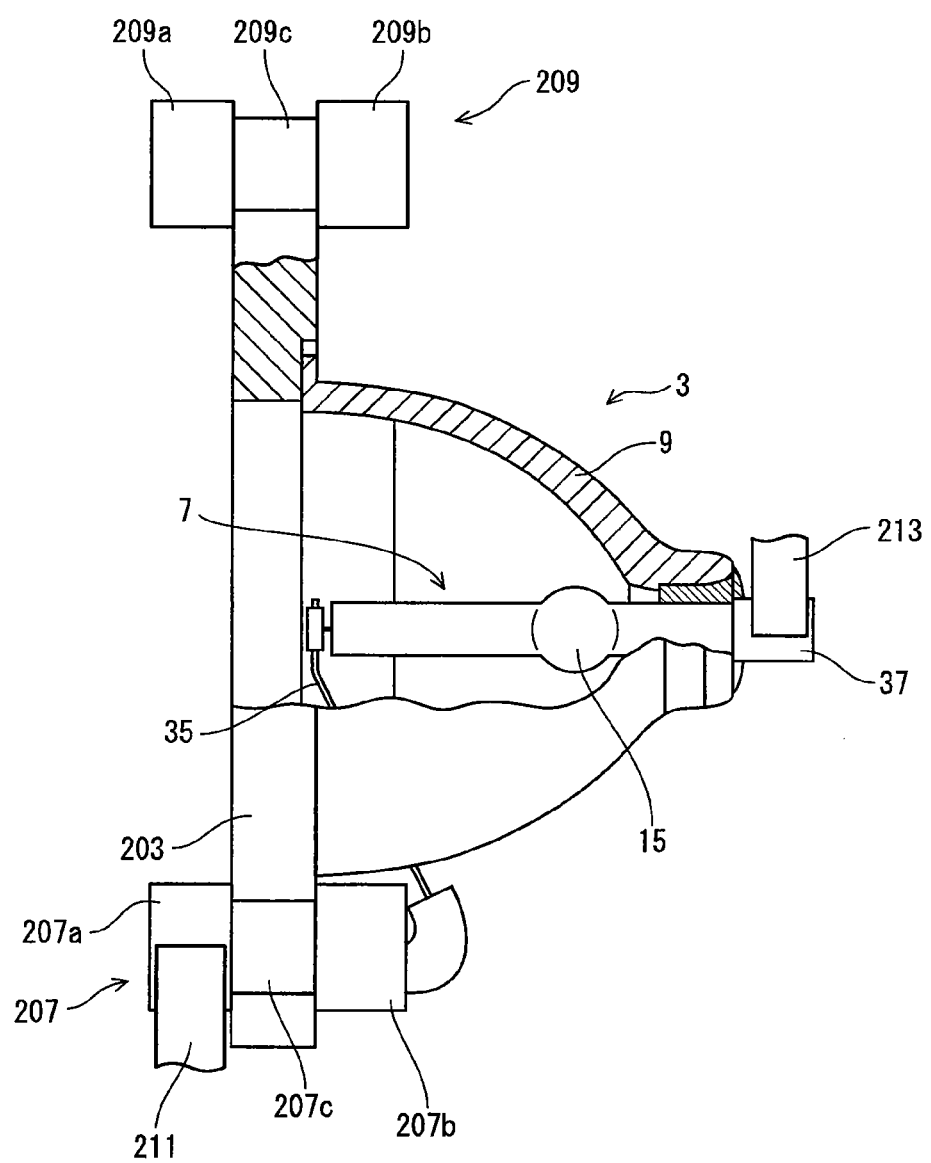
FIG. 9 shows the lamp apparatus as seen in an arrow X1 direction shown in FIG. 8.
Figure 10:
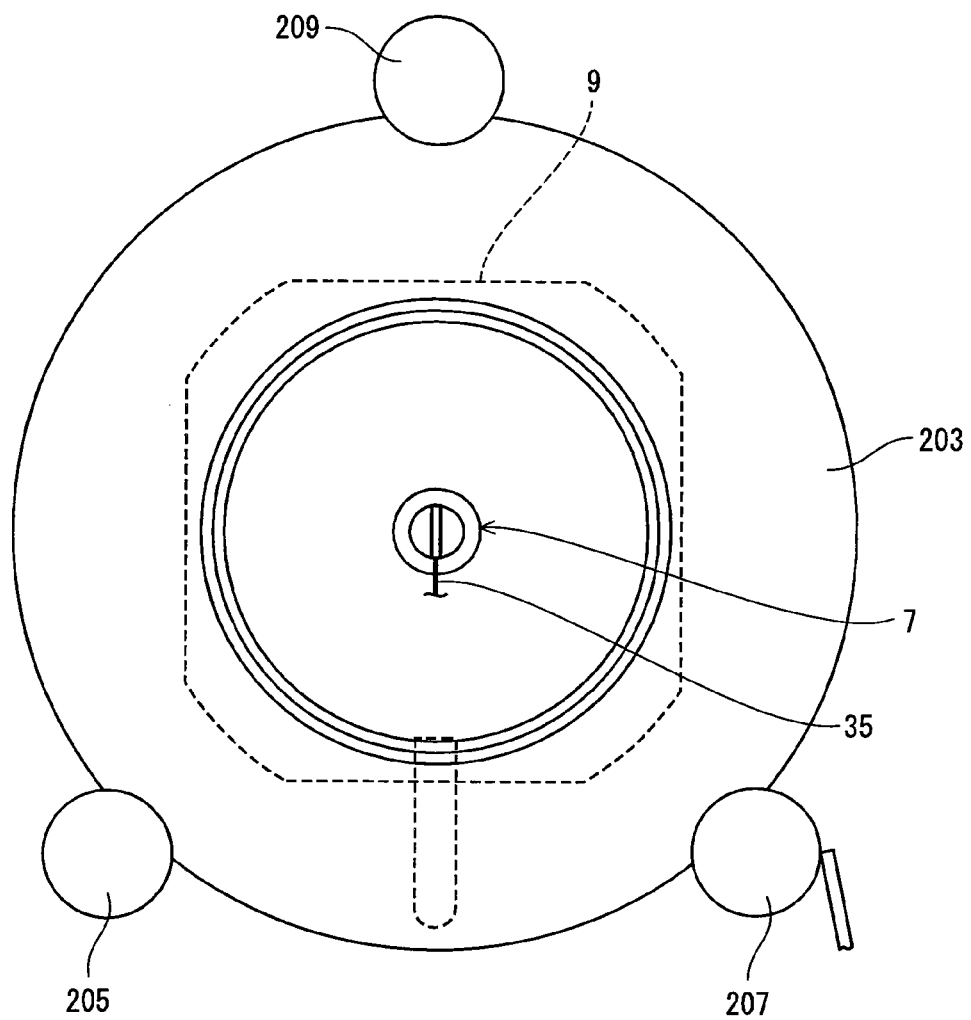
FIG. 10 shows the lamp apparatus as seen in an arrow Y1 direction shown in FIG. 8.

FIG. 8 is a perspective view of a lamp apparatus 201 according to a third embodiment of the present invention. FIG. 9 shows the lamp apparatus 201 as seen in an arrow X1 direction shown in FIG. 8. FIG. 10 shows the lamp apparatus 201 as seen in an arrow Y1 direction shown in FIG. 8.

As shown in FIGS. 8-10, the lamp apparatus 201 includes the lamp unit 3, a rotating body 203 ("first rotating body" of the present invention) attached to the lamp unit 3 at the vicinity of the opening thereof. The rotating body 203 is rotatably supported by three rotating rollers 205, 207 and 209. In addition, the three rotating rollers 205, 207 and 209 correspond to "first rotation supporting unit" of the present invention.

In the present embodiment, each of the three rotating rollers 205, 207 and 209 is disposed so as to correspond to a different one of angles of an equilateral triangle, when the rotating body 203 is seen in the drawing direction of the optical axis, that is, seen from the opposite side of the base 37 of the lamp unit 3 (see FIG. 10). The rotating rollers 207 and 209 have, as shown in FIG. 9, a pair of large diameter sections 207a and 207b and a pair of large diameter sections 209a and 209b, respectively. The pair of large diameter sections 207a and 207b and the pair of large diameter sections 209a and 209b sandwich small diameter sections 207c and 209c, respectively. An outer circumferential portion of the rotating body 203 engages between the pairs of large diameter sections 207a and 207b, 209a and 209b, so as to be rotatably supported.

Although not shown in FIG. 9, the rotating roller 205 has large diameter sections 205a and 205b, and a small diameter section 205c, in the same way as the rotating rollers 207 and 209.

At least one of the rotating rollers 205, 207 and 209 is directly or indirectly connected to the driving motor. The lamp unit 3 is rotated by rotating of the rotating roller connected to the driving motor.

Electric power is fed via feeding members ("second feeding member" of the present invention) 211 and (a slip ring is used, for example) 213, to the pair of electrodes of the lamp 7 that constitutes the lamp unit 3. The lead 35 connected to one electrode is electrically connected to the metallic rotating body 203, and the feeding member 211 is electrically connected to the rotating body 203. The lead connected to the other electrode is connected to the base 37, and the feeding member 213 is electrically connected to the base 37.

The lamp apparatus 201 according to the third embodiment includes the lamp unit 3 attached to the rotating body 203 so as to rotate the rotating body 203 that is rotatably supported by the rotating rollers 205, 207 and 209 in a predetermined direction (precisely, rotate the rotating body 203 to which the lamp unit 3 is attached). As a result, the temperature can be uniformed in the light-emitting part 15 during lighting.

Regarding the lamp apparatus 201 in this configuration, the lamp unit 3 is attached to the rotating body 203, such that the central axis of the rotating body 203 coincides with the optical axis of the reflector 9. As a result, the structure for attaching the lamp unit 3 to the rotating body 203 can be simplified.

In addition, since the lamp unit 3 is attached to the rotating body 203 at the vicinity of the opening of the reflector 9, the lamp unit 3 is supported by the rotating body 203 such that the position of the center of gravity of the lamp unit 3 is near the rotating body 203. This enables the lamp unit 3 to rotate stably.

Modifications

1. Drive Transmission Mechanism

In the first embodiment, the pair of rotating bodies 57 and 59 is mounted on the pair of rotating rollers 65 and 67, and the pair of rotating bodies 57 and 59 are rotated by rotation of the rotating shaft 69 included in the rotating roller 65, such that the lamp unit 3 is rotated in a predetermined direction. However, the pair of rotating bodies 57 and 59 may be rotated by another method.

As another method for rotating the lamp unit in a predetermined direction, it may be possible to employ a method of rotating the pair of (or one of) rotating bodies by using a driving roller other than the pair of rotating rollers (65 and 67) with which the supporting unit 4 is rotatably supported (this example is a Modification 1).

Alternatively, it may be possible to employ a method of conveying driving by a gear structure in which the outer circumferential surface of the rotating bodies and the outer circumferential surface of the rotating rollers have concavity and convexity meshed with each other (this example is a Modification 2). Also, a belt may connect the rotating bodies to a rotary section that is mounted on the rotating shaft of a drive motor, such that driving of the drive motor may be conveyed. Furthermore, the lamp unit (specifically the base and the seal part) may be rotated directly by the drive motor.

(1) Modification 1

Figure 11:
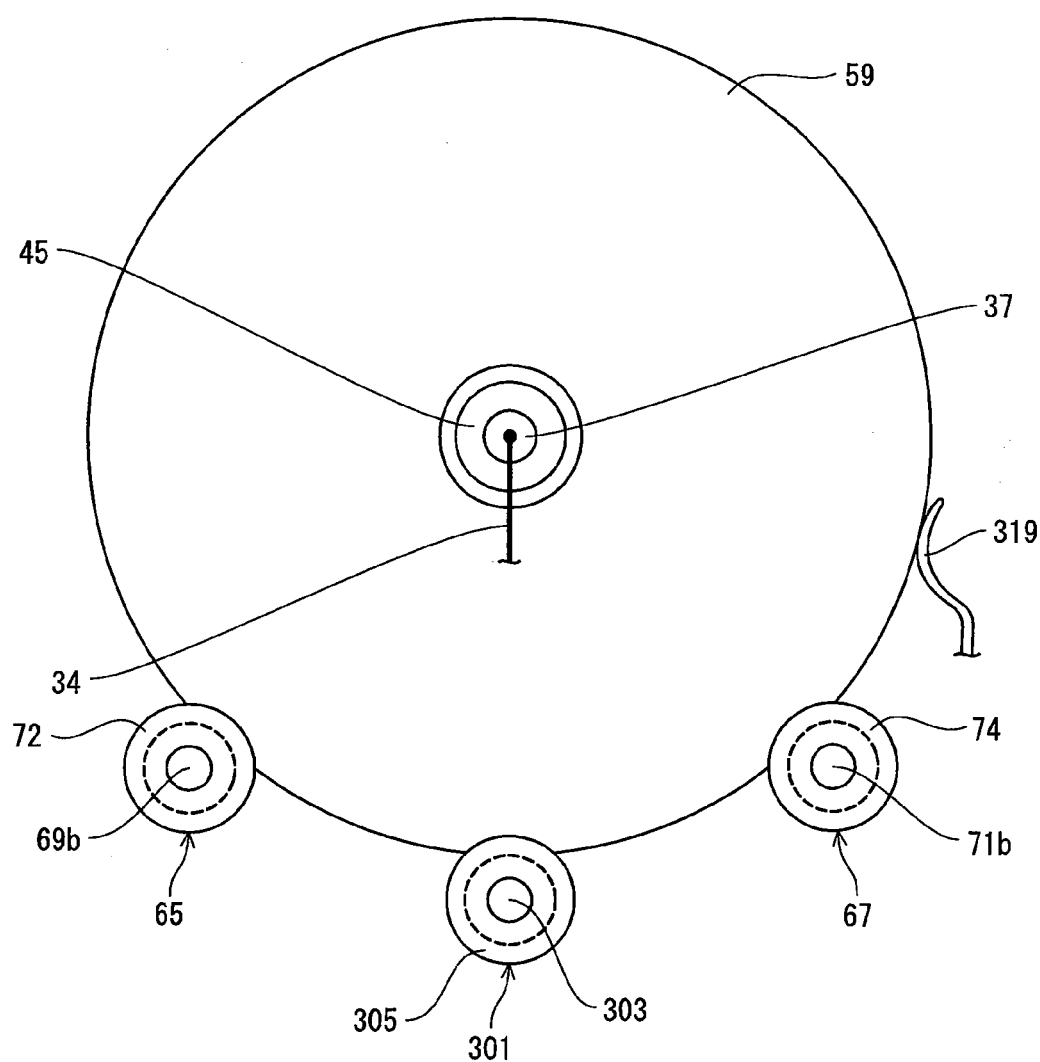
FIG. 11 shows a lamp apparatus according to a Modification 1 as seen in a drawing direction of an optical axis.

FIG. 11 shows a lamp apparatus 300 according to the Modification 1 as seen in a drawing direction of an optical axis.

In the lamp apparatus 300 according to the Modification 1, similarly to the first embodiment, a pair of rotating bodies 57 and 59 is placed on a pair of rotating rollers 65 and 67, for example. One of the rotating bodies, for example, the rotating body 59 positioned at the vicinity of the base 37, is directly rotated.

That is, the rotating body 59 is rotated by a rotating roller 301 ("rotation driving unit" of the present invention). The rotating roller 301 includes a rotating shaft (a driving shaft) 303 connected to the drive motor and a roller part 305 attached to the rotating shaft 303.

Even in this case, since the rotating body 59 is electrically connected to the feeding member 81, an insulation countermeasure is needed, such as using an insulating material for a part (a roller part 305) that slides with the rotating body 59 that is nearer to the drive motor than the rotating body 57, or using an insulating material for a rotating shaft.

Like the Modification 1, when the lamp unit is rotated by the rotating roller 301 other than the rotating rollers 65 and 67, a load on the rotating rollers 65 and 67 is only a load of the lamp unit and others. Compared with the case when the rotating bodies 57 and 59 are rotated by the rotating rollers 65 and 67, respectively, the load on the rotating rollers 65 and 67 can be reduced.

(2) Modification 2

Figure 12:
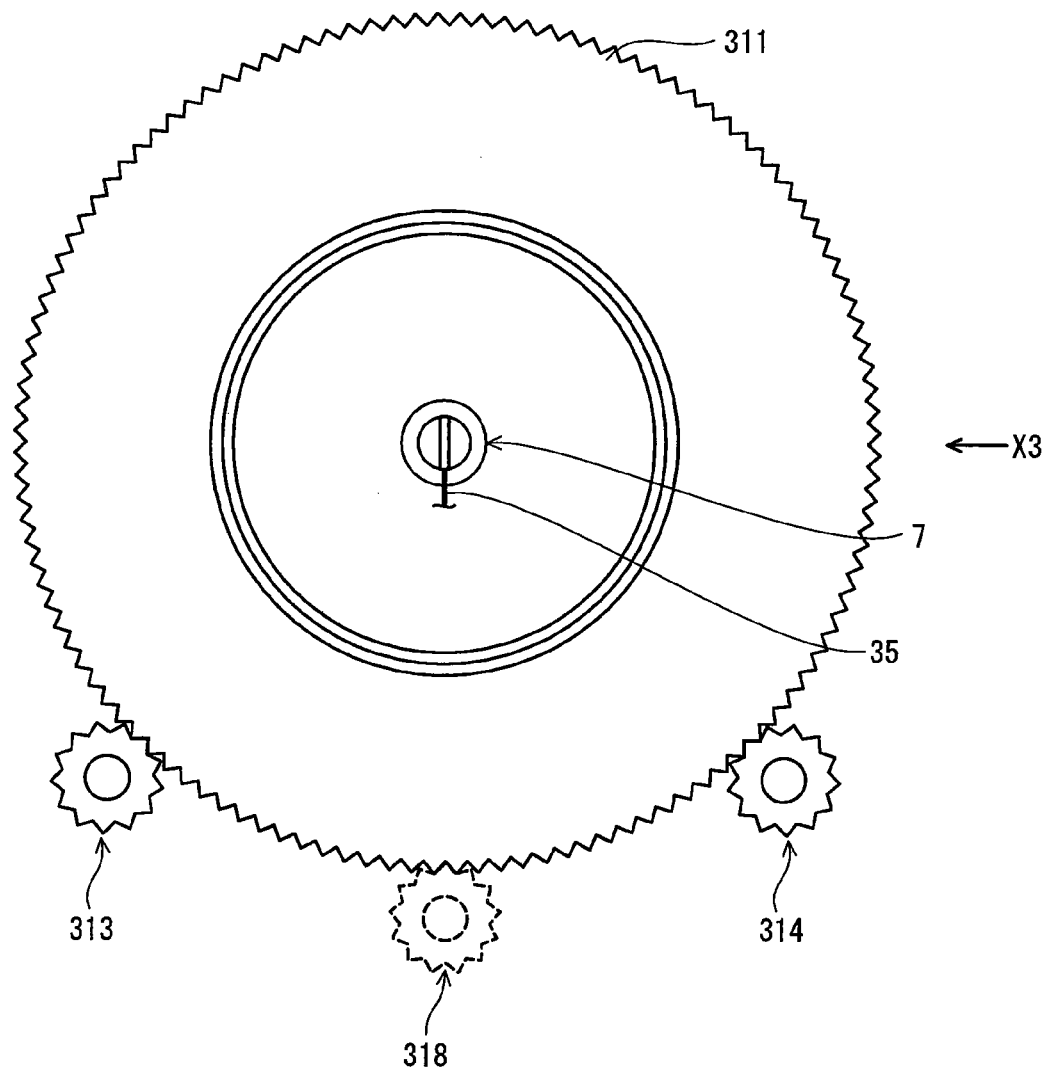
FIG. 12 shows a lamp apparatus according to a Modification 2 as seen in a drawing direction of an optical axis.
Figure 13:
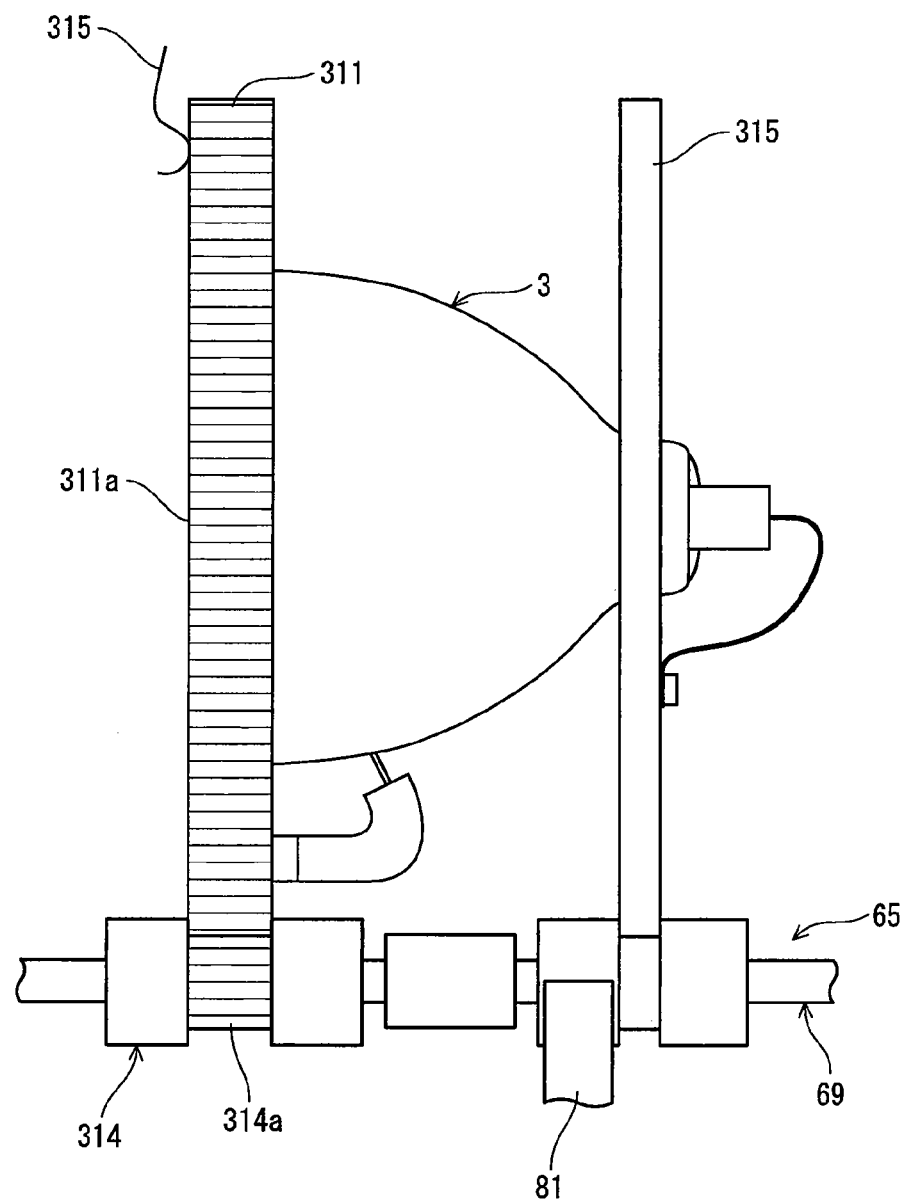
FIG. 13 shows the lamp apparatus according to the Modification 2 as seen in an arrow X3 direction shown in FIG. 12.

FIG. 12 shows a lamp apparatus 310 according to the Modification 2 as seen in a drawing direction of an optical axis. FIG. 13 shows the lamp apparatus 310 according to the Modification 2, as seen in an arrow X3 direction shown in FIG. 12.

Regarding the lamp apparatus 310 according to the Modification 2, a rotating body is rotated by a gear mechanism.

The basic structure of the lamp apparatus 310 is the same as the basic structure of the first embodiment. The lamp apparatus 310 includes a rotating body 313 and roller parts 313 and 314, which correspond to the rotating body (57) and the roller parts (73 and 75) according to the first embodiment, respectively, except the rotating body 311 and the roller parts 313 and 314 each have a zigzag-shaped outer circumferential surface. The lamp apparatus 310 rotates the gear-shaped rotating body 311 by engaging the rotating body 311 with a recessed portion 314a of the gear-shaped roller part 314.

In the case when the rotating body 311 is driven by using the gear structure, like the Modification 2, electric power may be fed to the lamp (7) through a slip ring ("first feeding member" of the present invention) 315 that is electrically connected to a side surface 311a of the rotating body 311, as shown in the FIG. 13, for example.

In this structure, the rotating body 311 is rotated by the rotating rollers (roller parts 313, 314) that rotatably support the rotating body 311. However, the rotating body 311 may be rotated by another gear (reference number 318, represented by broken line in FIG. 12) other than the rotating rollers.

2. Electric Power Feeding

In the first embodiment, electric power is fed through the feeding members (slip rings) 81 and 83, to the roller parts 72 and 73 included in the rotating roller 65, which slides with the rotating bodies 57 and 59 that are electrically connected to the pair of respective electrodes. However, another method may be used for feeding electric power. For example, as another method, a slip ring (reference number 319 in FIG. 11) may be directly connected (contacted) to the pair of rotating bodies 59 and 57.

Electric power may be fed by other methods without using a slip ring. For example, electric power may be fed via a bearing that supports a rotating shaft.

3. Rotating Bodies (1) Materials

The first embodiment has the structure in which the rotating bodies 57 and 59 themselves each have an annular shape with a circular outer circumference. However, the rotating bodies with an annular circumferential surface may be connected integrally to other members in other shapes, for example (this is a Modification 3).

Figure 14:
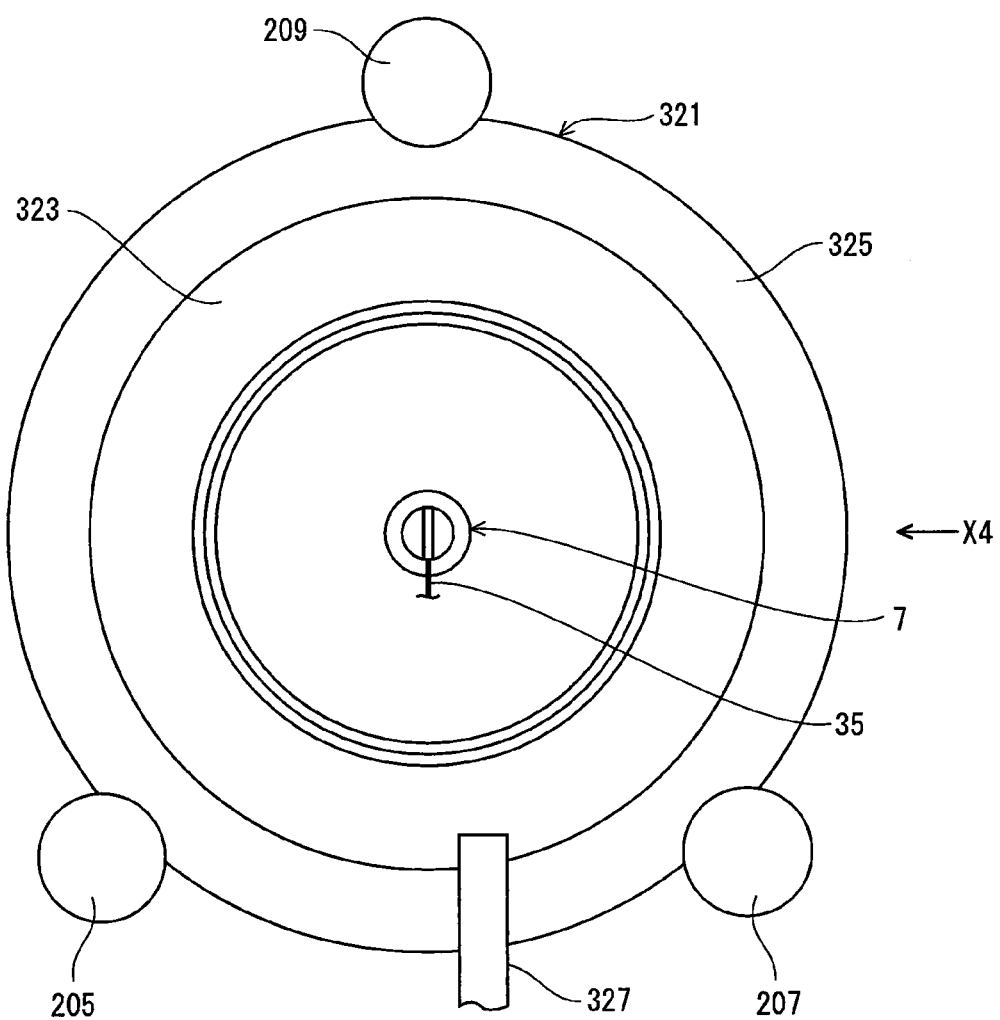
FIG. 14 shows a lamp apparatus according to a Modification 3 as seen in a drawing direction of an optical axis.
Figure 15:
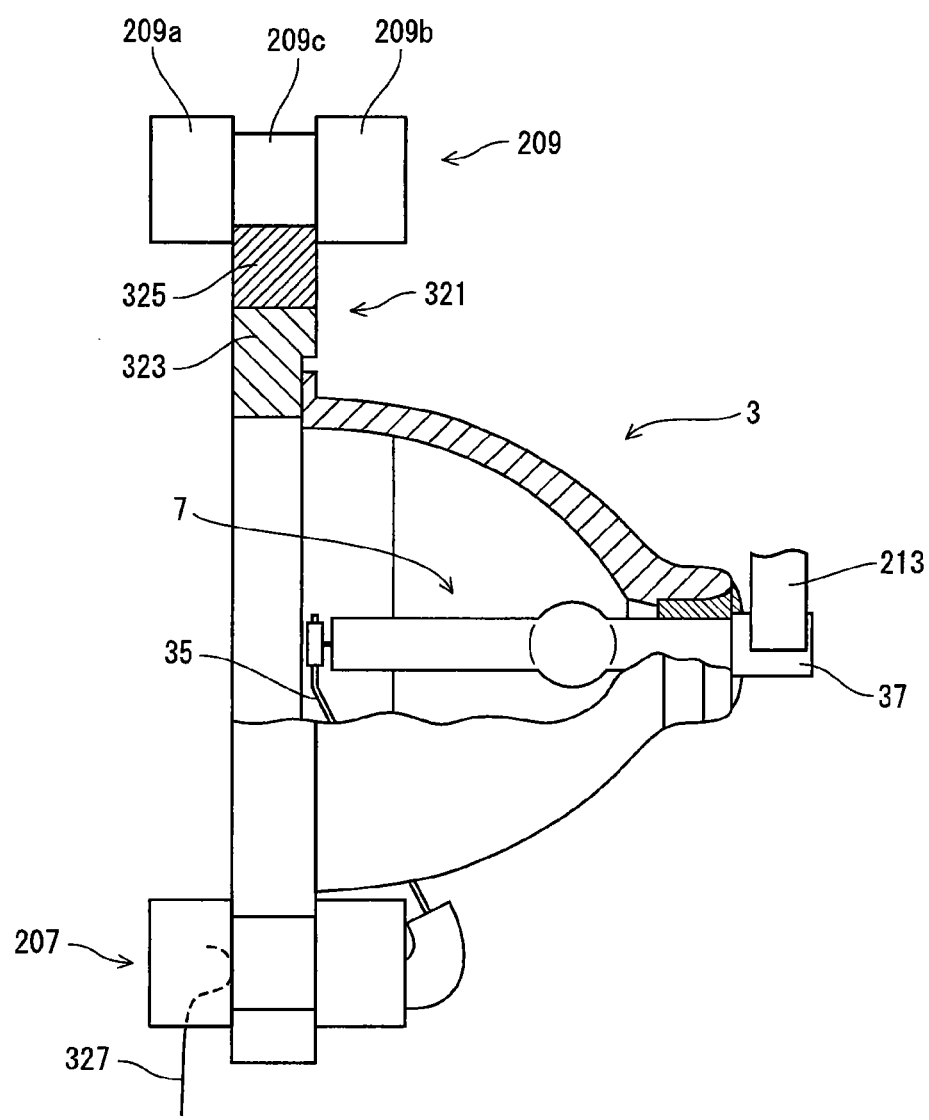
FIG. 15 shows the lamp apparatus according to the Modification 3 as seen in an arrow X4 direction shown in FIG. 14.

FIG. 14 shows a lamp apparatus 320 according to the Modification 3 as seen in a drawing direction of the optical axis. FIG. 15 shows the lamp apparatus 320 according to the Modification 3 as seen in an arrow X4 direction in FIG. 14.

The lamp apparatus 320 according to the Modification 3 is similar to the lamp apparatus of the third embodiment, but a structure of a rotating body 321 according to the Modification 3 is different from that of the third embodiment.

The rotating body 321 ("first rotating body" of the present invention) includes a conductive ring ("conductive portion of the first rotating body" of the present invention) 323 and a resin ring 325 that covers an outer circumferential surface of the conductive ring 323. In this case, electric power is fed through a slip ring ("first feeding member" of the present invention) 327 that is electrically connected to the conductive ring 323 of the rotating body 321, like the slip ring (315) in FIG. 13, for example.

(2) Shape

The first embodiment has the structure in which the rotating bodies 57 and 59 themselves each have an annular shape with an outer circumferential surface. However, the entire shape of the rotating bodies 57 and 59 may be a polygonal plate-like member that has an annular rotating-body part on one of its main surfaces. In this case, the same effects as the first embodiment can be provided, if rotating rollers are in contact with a circumferential surface of the rotating-body part and rotatably support a supporting unit.

4. Rotating Unit

The supporting unit 4 is rotatably supported by the rotating unit 5 of the first embodiment, using the rotating rollers 65 and 67 located parallel to each other. However, the supporting unit may be rotatably supported by other methods (This is a Modification 4).

Figure 16:
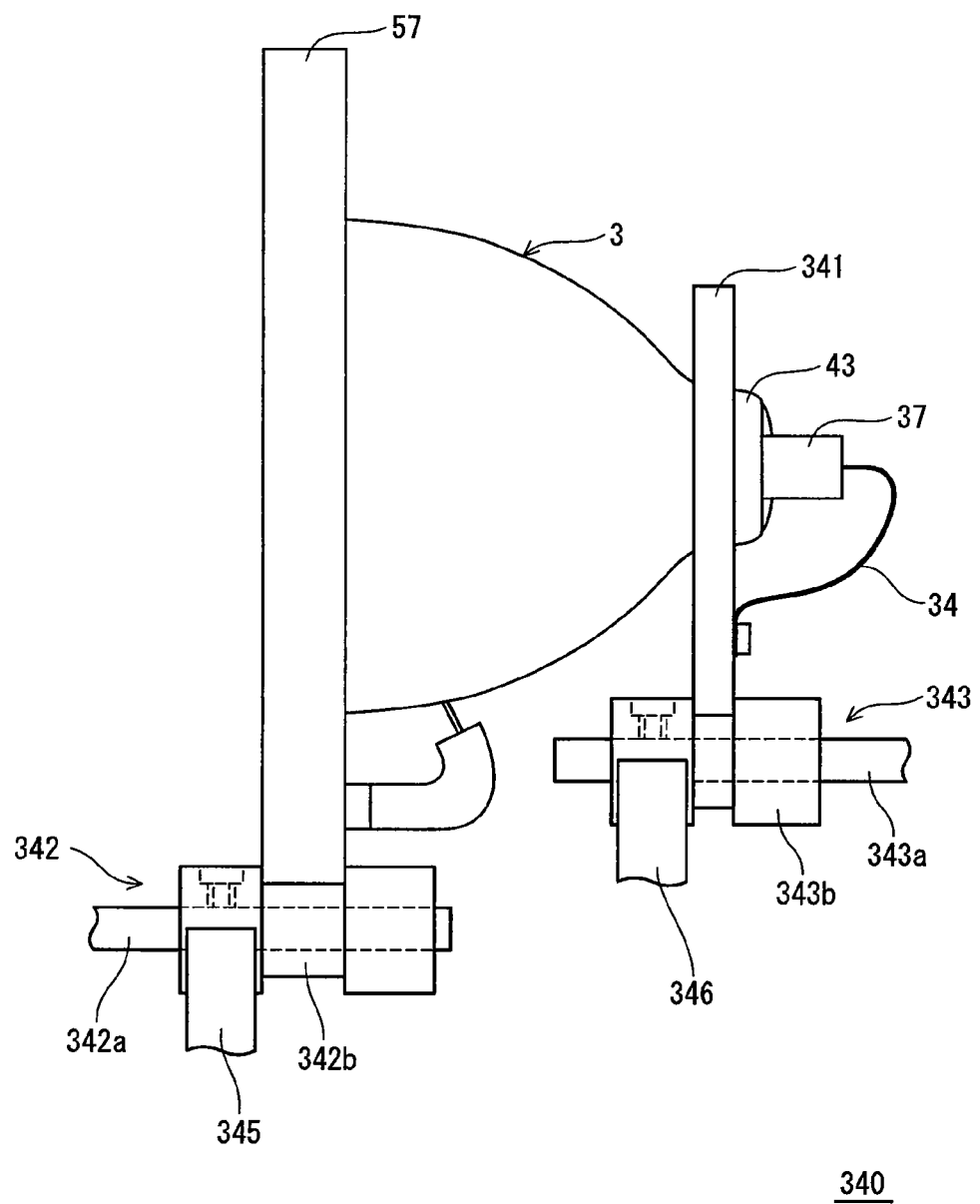
FIG. 16 shows a lamp apparatus according to a Modification 4 as seen in a direction perpendicular to an optical axis of a reflector.

FIG. 16 shows a lamp apparatus 340 according to the Modification 4 as seen in a direction perpendicular to an optical axis of the reflector 9.

In the lamp apparatus 340 according to the Modification 4, the lamp unit 3 is supported by the rotating body ("first rotating body" of the present invention) 57 attached to the reflector 9 at a vicinity of an opening thereof and a rotating body ("second rotating body" of the present invention) 341 attached to the lamp supporting section 43 of the reflector 9.

Like the rotating bodies 57 and 59 of the first embodiment, the rotating bodies 341 and 57 each have an annular shape with a circular outer circumference, and a central axis of each rotating body coincides with the optical axis of the reflector 9. As can be seen obviously from FIG. 16, a radius of the rotating body 57 is larger than a radius of the rotating body 341.

The rotating body 57 ("first rotation supporting unit" of the present invention) is rotatably supported by a pair of rotating rollers 342 (FIG. 16 shows only one of the rotating rollers 342 located in front). Each of the pair of rotating rollers 342 is composed of a rotating shaft 342a and a roller part 342b, and located parallel to the optical axis.

On the other hand, like the rotating body 57, the rotating body 341 ("second rotation supporting unit" of the present invention) is supported by a pair of rotating rollers 343 (FIG. 16 shows only one of the rotating rollers 343 located in front). Each of the pair of rotating rollers 343 is also composed of a rotating shaft 343a and a roller part 343b, and located parallel to the optical axis.

In position relation between the rotating rollers 343 and the rotating rollers 342 that support the rotating body 57, central axes of the rotating shafts 342a and central axes of the rotating shafts 343a are not on the same line, but are parallel to one another.

In addition, in the case where the rotating roller 343 is located at substantially the center of the pair of the rotating rollers 342 as seen in a drawing direction of the optical axis, even a single rotating roller can support the supporting unit in conjunction with the two rotating rollers 342 located at the vicinity of the opening of the reflector.

The driving for rotating the rotating bodies 57 and 341 may be conveyed by at least one of the rotating rollers (342 and 343) in contact with the circumferential surface of the rotating bodies 57 and 341 like the first embodiment. Or at least one of the rotating bodies 57 and 341 may be directly rotated like the Modification 1 (it corresponds to "rotation driving unit" of the present invention).

In addition, in the Modification 4, electric power is fed to the lamp 7 by a contact between a feeding member 345 ("first feeding member" of the present invention) and the roller part 342b, and a contact between a feeding member 346 ("second feeding member" of the present invention) and the roller part 343b.

5. Supporting Unit

The supporting unit 4 of the first embodiment is composed of the pair of rotating bodies 57 and 59, and the plural (here two) connecting rods 61 that connect the pair of rotating bodies 57 and 59. Alternatively, a gap between the pair of rotating bodies may be filled with a filler, for example (this is a Modification 5).

Figure 17:
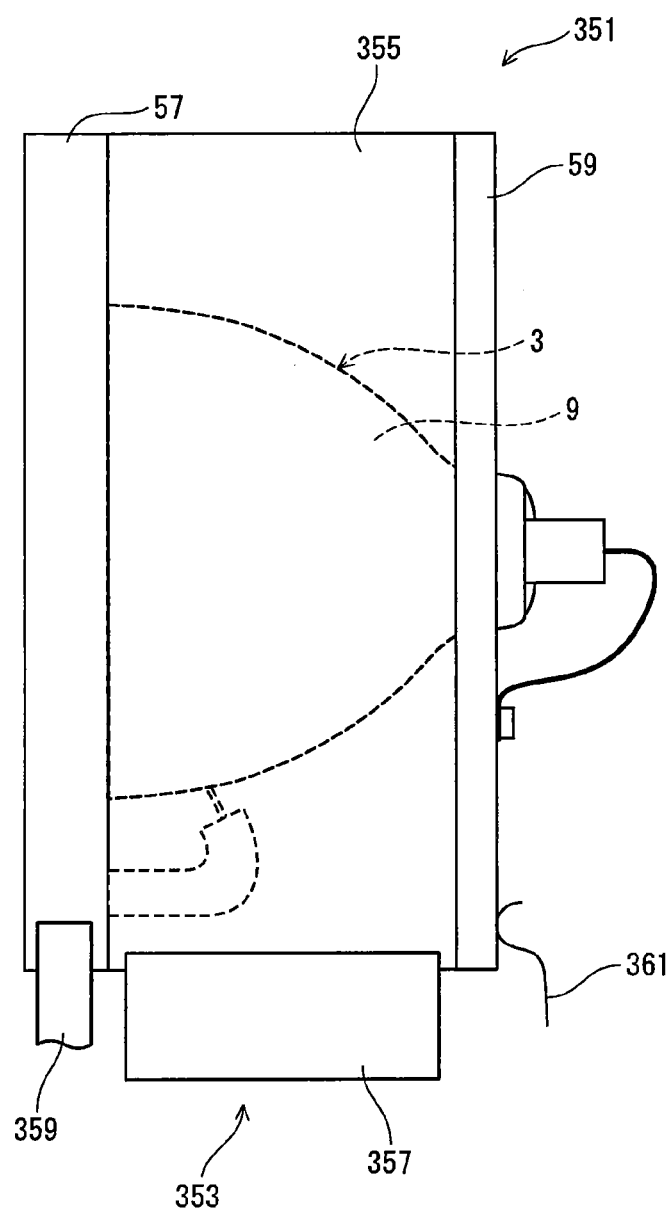
FIG. 17 shows a lamp apparatus according to a Modification 5 as seen in a direction perpendicular an optical axis of a reflector.

FIG. 17 shows a lamp apparatus according to Modification 5 as seen in a direction perpendicular to an optical axis of the reflector 9.

The lamp unit 350 includes a supporting unit 351, a rotating unit 353 and others.

The supporting unit 351 includes a pair of the rotating bodies 57 and 59 that are located substantially parallel to each other, and a filler 355 that fills a gap between the pair of rotating bodies 57 and 59 to adhere to the pair of rotating bodies. The filler 355, as seen from the drawing direction of the optical axis, has a circular outer circumference whose center is located on the optical axis.

Like the first embodiment, the rotating unit 353 is composed of the pair of rotating rollers 357 located parallel to the optical axis of the reflector 9. The pair of rotating rollers 357 rotatably support the outer circumferential surface of the filler 355.

In the Modification 5, at least one of the pair of rotating rollers 357 is connected to the drive motor (rotary drive source). The rotating roller 357 conveys the rotative force to the filler 355 supported by the pair of rotating rollers 357, so as to rotate a whole of the supporting unit 351.

In addition, in the Modification 5, electric power is fed to the lamp (7) by a contact between a feeding member 359 and the rotating body 57, and a contact between a feeding member 361 and the rotating body 59.

6. Lamp

The present invention is preferably applied to a high-pressure discharge lamp apparatus that has a high-pressure discharge lamp that contains mercury especially of 250 [mg/cm$^3$] or greater in a discharge space. In the case where the mercury of 250 [mg/cm$^3$] or greater is enclosed in the discharge space, a mercury vapor pressure during a lighting operation becomes overly high and the tendency towards the above-mentioned blackening and devitrification increases. Consequently, an application of the present invention is capable of demonstrating significantly the effects.

7. Consequence

The present invention has been variously explained through the embodiments and modifications. The configuration explained in each embodiment may be applied (added or converted) to other embodiments or modifications, and the configuration explained in each modification may be applied (added or converted) to other embodiments or modifications.

INDUSTRIAL APPLICABILITY

The high-pressure discharge lamp apparatus of the present invention is useful in preventing excessive increase in temperature in a part of the high-pressure discharge lamp, in order to use the high-pressure discharge lamp over a long term.

REFERENCE SIGNS LIST 1 high-pressure discharge lamp apparatus
3 lamp unit
4 supporting unit
5 rotating unit
7 lamp
9 reflector
11 arc tube
21, 23 pair of electrodes
53 unit supporting unit
55 rotation supporting unit
56 drive motor
57, 59 rotating bodies
65, 67 rotating rollers
81, 83 feeding members
101 projector

The invention claimed is:

1. A high-pressure discharge lamp apparatus, comprising:
a lamp unit that comprises a high-pressure discharge lamp with a discharge casing with a pair of electrodes, the high-pressure discharge lamp is fixed to a reflector, such that a central axis of the high-pressure discharge lamp coincides with an optical axis of the reflector wherein light emitted is directed through an opening in the reflector;
a first rotating body has an annular cross-section, and is attached to the reflector at a vicinity of the opening thereof, such that a center of the first rotating body is located on the optical axis;
a first rotation supporting unit supports the first rotating body rotatably on the center thereof;
a rotation driving unit drives the first rotating body to enable the lamp unit to rotate in one direction about the central axis;
a feeding unit feeds electric power to the high-pressure discharge lamp having a first feeding member, wherein the first rotating body has a first conductive portion that extends around an axis of the first rotating body, to which a first electrode of the high-pressure discharge lamp is electrically connected, and the first feeding member is electrically connected to the first conductive portion;
a second rotating body that has an annular cross-section, and is attached to the reflector at a vicinity of a base of the high-pressure discharge lamp, such that a center of the second rotating body is located on the optical axis; and
a second rotation supporting unit that supports the second rotating body rotatably on the center thereof, and the feeding unit that having a second feeding member, wherein the second rotating body has a second conductive portion that extends around an axis of the second rotating body, to which a second electrode of the high-pressure discharge lamp is electrically connected, and the second feeding member is electrically connected to the second conductive portion.

2. The high-pressure discharge lamp apparatus of claim 1, wherein the rotation driving unit rotates the first rotating body so as to rotate the lamp unit.

3. The high-pressure discharge lamp apparatus of claim 2, wherein the first rotating body has an annular shape with a circular outer circumference, and the rotation driving unit has a rotary body which is in contact with an outer circumferential surface of the first rotating body, and rotates the first rotating body by rotatably driving the rotary body.

4. The high-pressure discharge lamp apparatus of claim 3, wherein the first feeding member includes a slip ring that contacts with the first conductive portion.

5. The high-pressure discharge lamp apparatus of claim 1, wherein the second feeding member includes a slip ring that contacts with the second conductive portion.

6. The high-pressure discharge lamp apparatus of claim 1, wherein the lamp unit rotates at a rotation speed in a range of 1 to 20 rotations per minute.

7. The high-pressure discharge lamp apparatus of claim 1, wherein the high-pressure discharge lamp is a high-pressure mercury lamp that contains mercury of 250 mg/cm$^3$ or greater.

8. A projector, comprising:
the high-pressure discharge lamp apparatus of claim 1;
an optical unit operable to form an optical image by modulating light produced by the high-pressure discharge lamp apparatus; and
a projection unit operable to magnify the optical image and project the magnified optical image.

9. A high-pressure discharge lamp apparatus, comprising:
a lamp unit comprises a high-pressure discharge lamp fixed to a reflector, such that a central axis of the high-pressure discharge lamp coincides with an optical axis of the reflector;
a first rotating body is attached to the reflector at a vicinity of the opening thereof, such that a center of the first rotating body is located on the optical axis;
a first rotation supporting unit supports the first rotating body rotatably on the center thereof;
a rotation driving unit drives the lamp unit so as to rotate about the central axis;
a feeding unit feeds electric power to the high-pressure discharge lamp having a first feeding member, wherein the first rotating body has a first conductive portion that extends around an axis of the first rotating body, to which a first electrode of the high-pressure discharge lamp is electrically connected, and the first feeding member is electrically connected to the first conductive portion;
a second rotating body is attached to the reflector at a vicinity of a base of the high-pressure discharge lamp, such that a center of the second rotating body is located on the optical axis; and
a second rotation supporting unit that supports the second rotating body rotatably on the center thereof;
wherein the feeding unit has a second feeding member, and the second rotating body has a second conductive portion that extends around an axis of the second rotating body, to which a second electrode of the high-pressure discharge lamp is electrically connected, and the second feeding member is electrically connected to the second conductive portion.

10. The high-pressure discharge lamp apparatus of claim 9, wherein the first rotating body has an annular shape with a circular outer circumference, and the rotation driving unit has a rotary body which is in contact with an outer circumferential surface of the first rotating body, and rotates the first rotating body by rotatably driving the rotary body.

11. The high-pressure discharge lamp apparatus of claim 9, wherein the second feeding member includes a slip ring that contacts with the second conductive portion.

12. The high-pressure discharge lamp apparatus of claim 9, wherein the lamp unit rotates continually at a rotation speed within a range of 1 to 20 rotations per minute.

13. The high-pressure discharge lamp apparatus of claim 9, wherein the high-pressure discharge lamp is a high-pressure mercury lamp that contains mercury of 250 mg/cm$^3$ or greater.

14. The high-pressure discharge lamp apparatus of claim 9, wherein the rotation drive unit includes a drive motor to drive both the first rotating body and the second rotating body.

15. A projector, comprising:
the high-pressure discharge lamp apparatus of claim 9, further comprising an optical unit operable to form an optical image by modulating light produced by the high-pressure discharge lamp apparatus and a projection unit operable to magnify the optical image and project the magnified optical image.

16. A high-pressure discharge lamp apparatus, comprising:
a lamp unit comprises a high-pressure discharge lamp built into a reflector, such that a central axis of the high-pressure discharge lamp coincides with an optical axis of the reflector;
a first rotating body has an annular cross-section, and is attached to the reflector at a vicinity of the opening thereof, such that a center of the first rotating body is located on the optical axis;
a first rotation supporting unit supports the first rotating body rotatably on the center thereof;
a rotation driving unit drives the first rotating body to enable the lamp unit to rotate in one direction about the central axis;
a feeding unit feeds electric power to the high-pressure discharge lamp having a first feeding member, wherein the first rotating body has a first conductive portion that extends around an axis of the first rotating body, to which a first electrode of the high-pressure discharge lamp is electrically connected, and the first feeding member is electrically connected to the first conductive portion;
a second rotating body has an annular cross-section, and is attached to the reflector at a vicinity of a base of the high-pressure discharge lamp, such that a center of the second rotating body is located on the optical axis; and
a second rotation supporting unit supports the second rotating body rotatably on the center thereof, and the feeding unit having a second feeding member, wherein the second rotating body has a second conductive portion that extends around an axis of the second rotating body, to which a second electrode of the high-pressure discharge lamp is electrically connected, and the second feeding member is electrically connected to the second conductive portion.

17. The high-pressure discharge lamp apparatus of claim 16, wherein the rotation driving unit continuously rotates the first rotating body so as to rotate the lamp unit.

18. The high-pressure discharge lamp apparatus of claim 17, wherein the lamp unit rotates at a rotation speed within a range of 1 to 20 rotations per minute.

19. A projector, comprising:
the high-pressure discharge lamp apparatus of claim 1;
an optical unit operable to form an optical image by modulating light produced by the high-pressure discharge lamp apparatus; and a projection unit operable to magnify the optical image and project the magnified optical image.

* * * * *